(12) United States Patent
Ito et al.

(10) Patent No.: US 8,457,351 B2
(45) Date of Patent: Jun. 4, 2013

(54) IMAGE OBJECT DETECTION USING SEPARATE RANGES FROM BOTH IMAGE DETECTIONS

(75) Inventors: Hisao Ito, Oita (JP); Kozo Baba, Oita (JP); Akiyoshi Tafuku, Oita (JP); Taku Saito, Oita (JP); Masatoshi Tohno, Kawasaki (JP); Taku Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1133 days.

(21) Appl. No.: 11/844,097

(22) Filed: Aug. 23, 2007

(65) Prior Publication Data

US 2007/0291999 A1 Dec. 20, 2007

Related U.S. Application Data

(63) Continuation of application No. PCT/JP2005/002928, filed on Feb. 23, 2005.

(51) Int. Cl.
*G06K 9/00* (2006.01)

(52) U.S. Cl.
USPC .......................................... 382/103; 382/118

(58) Field of Classification Search
USPC .................................. 382/118, 103
See application file for complete search history.

(56) References Cited

U.S. PATENT DOCUMENTS

| | | | |
|---|---|---|---|
| 5,706,355 A * | 1/1998 | Raboisson et al. | 382/104 |
| 5,859,921 A | 1/1999 | Suzuki | |
| 6,061,400 A * | 5/2000 | Pearlstein et al. | 375/240 |
| 2004/0096082 A1* | 5/2004 | Nakai et al. | 382/104 |
| 2004/0151350 A1 | 8/2004 | Tafuku et al. | |

FOREIGN PATENT DOCUMENTS

| | | |
|---|---|---|
| JP | 04-174309 | 6/1992 |
| JP | 08-300978 | 11/1996 |
| JP | 2001-067459 | 3/2001 |
| JP | 2001-331795 | 11/2001 |
| JP | 2004-234367 | 8/2004 |
| JP | 2004-234494 | 8/2004 |

OTHER PUBLICATIONS

International Search Report mailed Apr. 11, 2005 in corresponding International Application No. PCT/JP2005/002928 (4 pp).
English translation of Chinese Office Action issued on Jul. 24, 2009 in corresponding Chinese Patent Application 200580047809.9.

* cited by examiner

*Primary Examiner* — David Zarka
(74) *Attorney, Agent, or Firm* — Staas & Halsey LLP

(57) ABSTRACT

Provided are an image processing method, an image processing system, an image processing device and a computer program for detecting a detection object such as nares of the driver with a high degree of accuracy in, for example, a system using an in-vehicle camera which is mounted on a vehicle and takes an image of the face of the driver. A detection object is diversified by a variety of detection methods such as a method for detecting a plurality of locations in the vertical direction as candidates during image pickup of an image, detecting a range to be a candidate of a detection object on the basis of the brightness of a pixel for each of rows of pixels lined up in the horizontal direction corresponding to each detected location and specifying a detection object from candidates of a detection object on the basis of the length of the detected range.

14 Claims, 24 Drawing Sheets

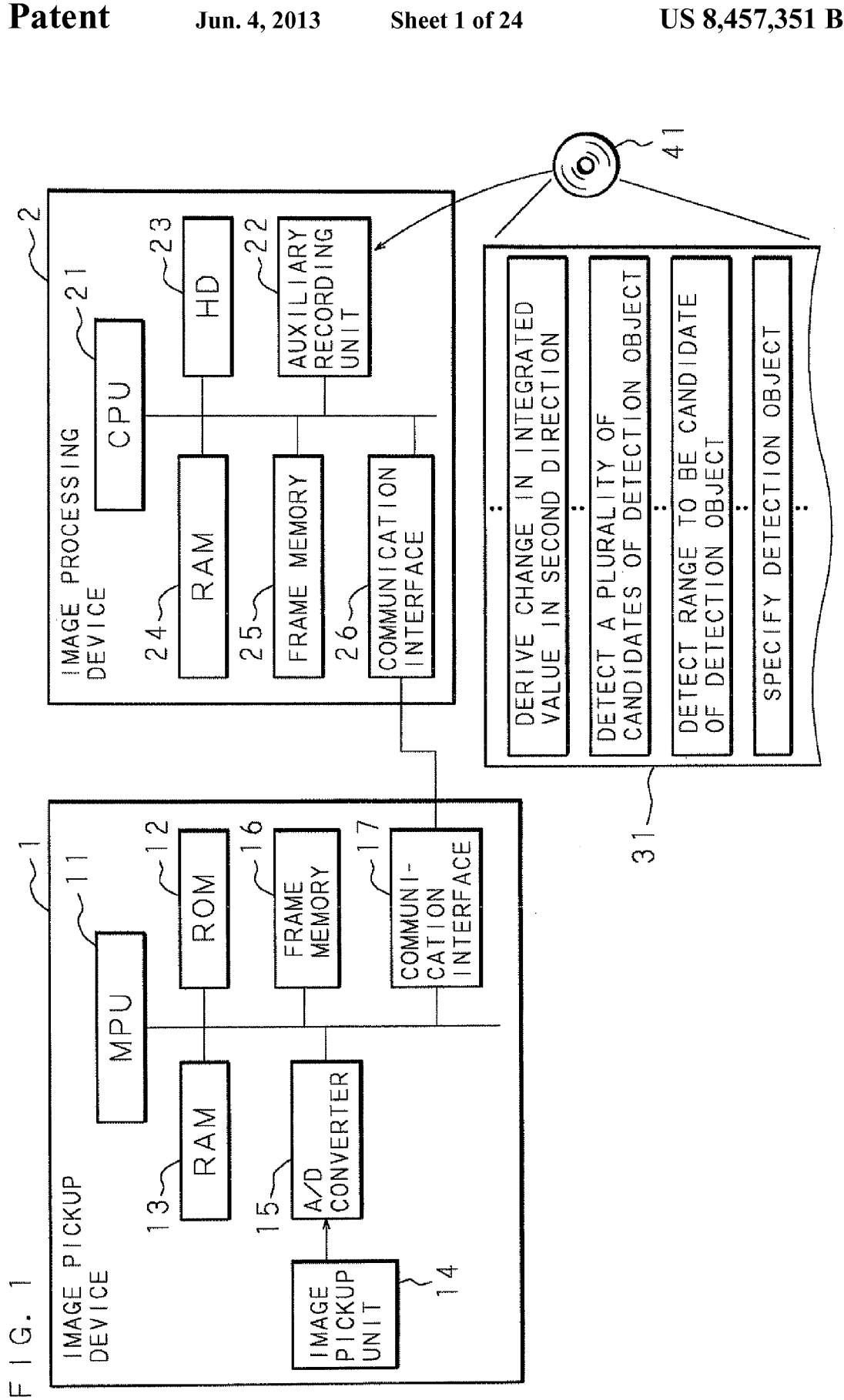

FIG. 4
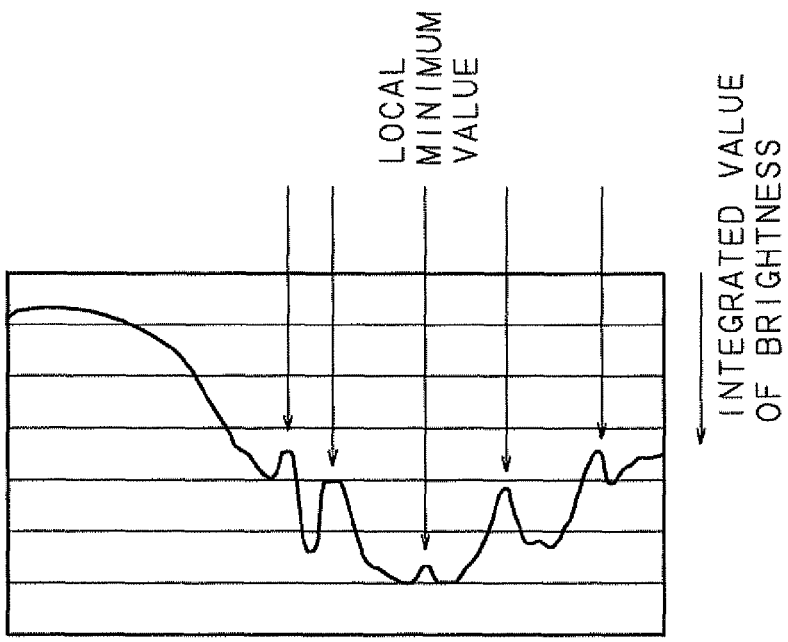
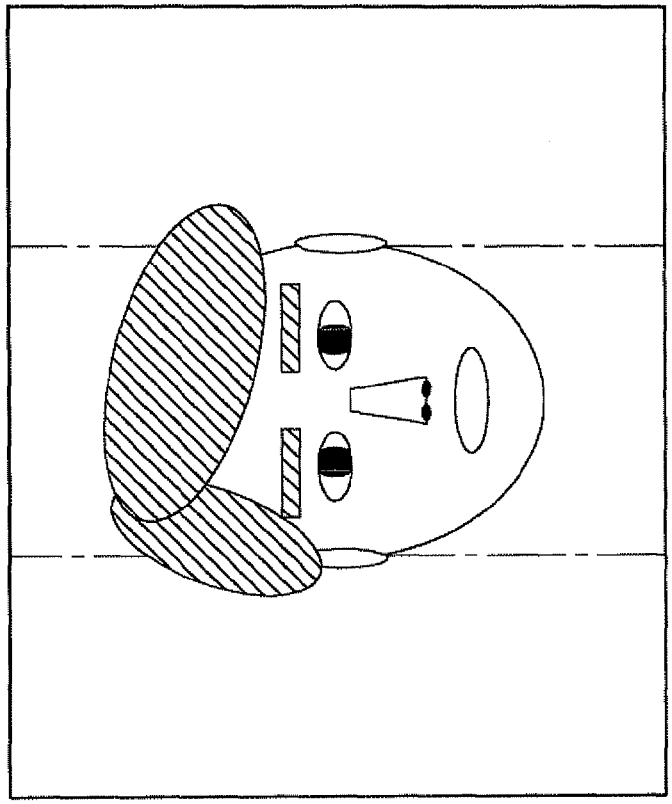

FIG. 6

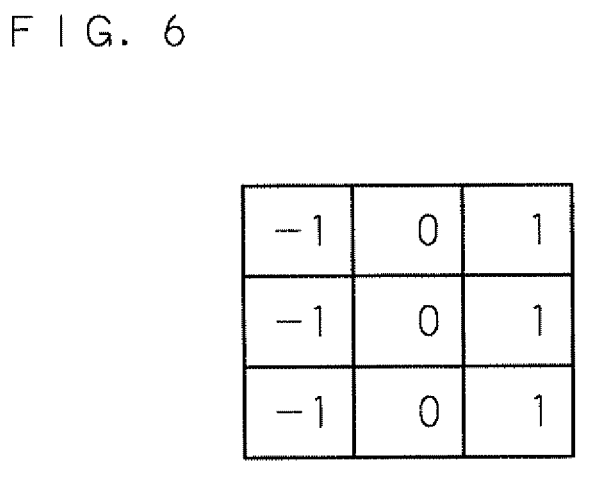

| -1 | 0 | 1 |
|----|---|---|
| -1 | 0 | 1 |
| -1 | 0 | 1 |

FIG. 8

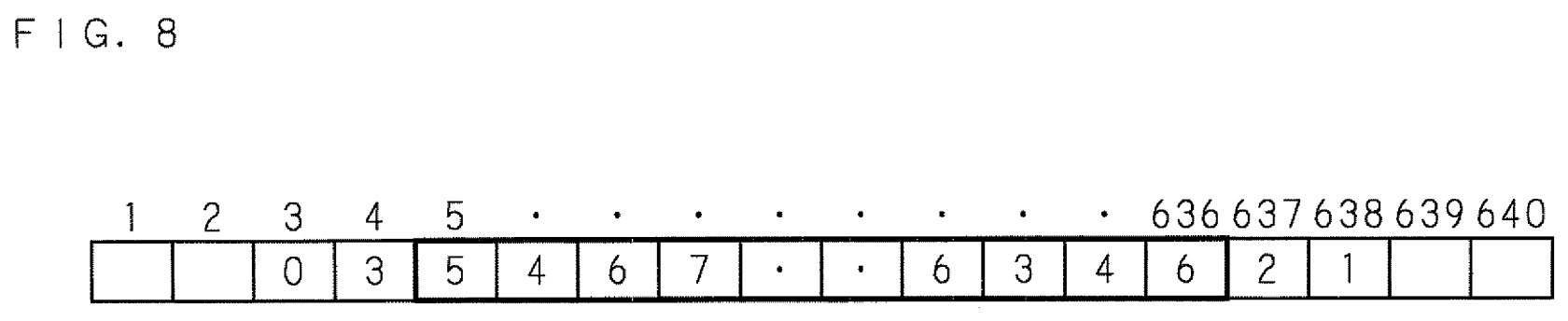

| 1 | 2 | 3 | 4 | 5 | • | • | • | • | • | • | • | • | 636 | 637 | 638 | 639 | 640 |
|---|---|---|---|---|---|---|---|---|---|---|---|---|-----|-----|-----|-----|-----|
|   |   | 0 | 3 | 5 | 4 | 6 | 7 | • | • | 6 | 3 | 4 | 6   | 2   | 1   |     |     |

F I G. 1 0

F I G. 14
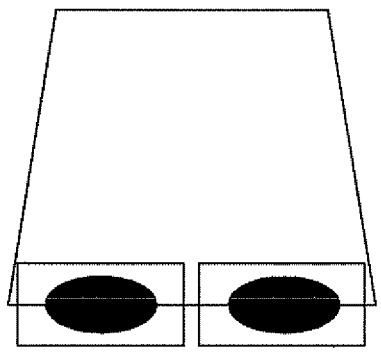

F I G. 1 6
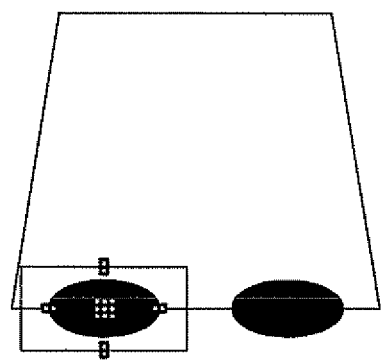

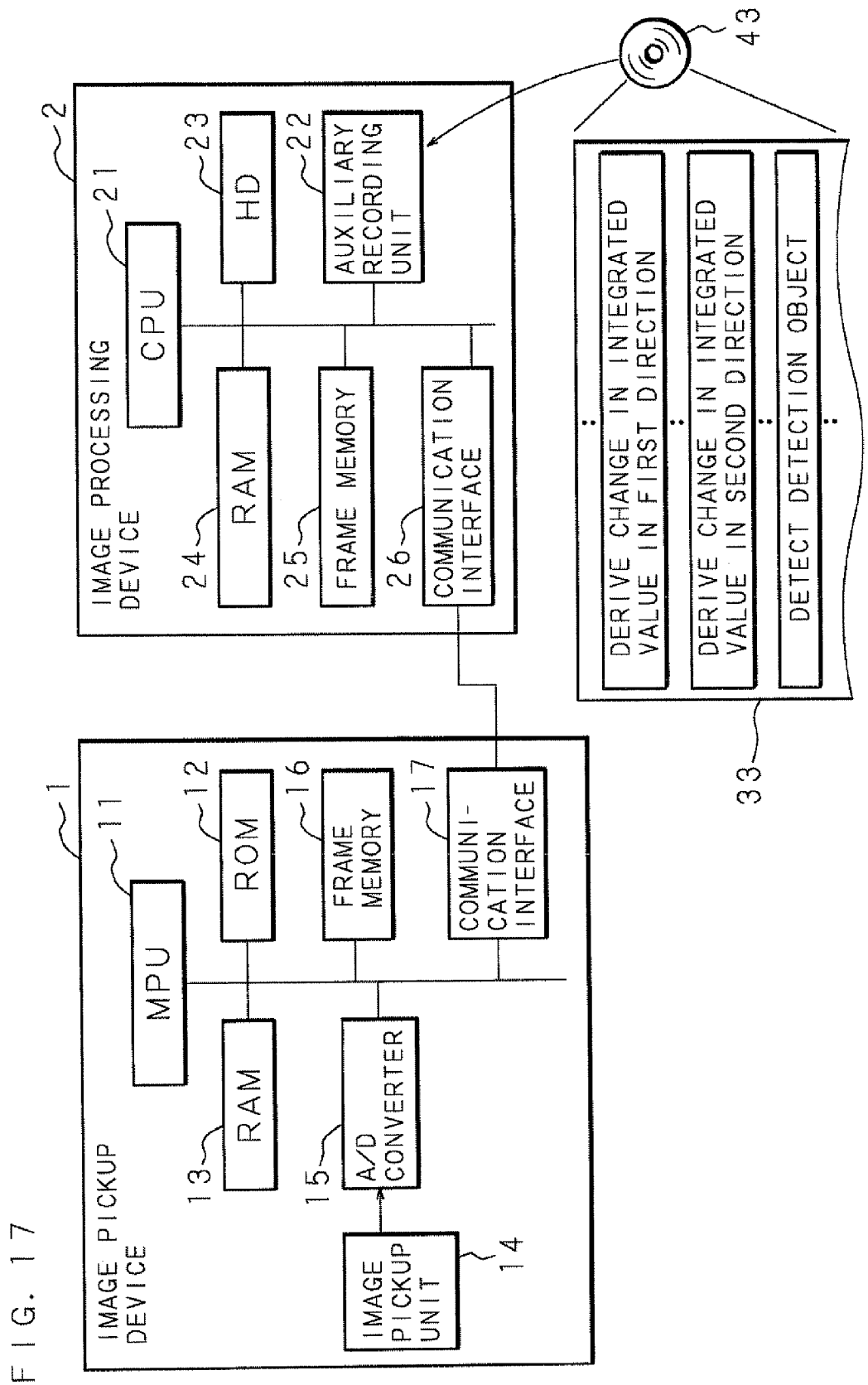

FIG. 20

| 1 | 0 | −1 |
|---|---|----|
| 1 | 0 | −1 |
| 1 | 0 | −1 |

FIG. 21

| 1 | 1 | 1 |
|---|---|---|
| 0 | 0 | 0 |
| −1 | −1 | −1 |

IMAGE OBJECT DETECTION USING SEPARATE RANGES FROM BOTH IMAGE DETECTIONS

This application is a continuation of PCT International Application No. PCT/JP2005/002928 which has an International filing date of Feb. 23, 2005, which designated the United States of America and is incorporated herein by reference.

TECHNICAL FIELD

The present invention relates to: an image processing method for detecting a specific detection object from a two-dimensional image in which pixels are lined up in a first direction and a second direction that are different from each other; an image processing device to which the image processing method is applied; an image processing system comprising the image processing device; and a computer program for realizing the image processing device, and in particular to an image processing method, an image processing device, an image processing system and a computer program for enhancing the detection accuracy of a detection object.

BACKGROUND ART

Suggested as a device to support driving of a vehicle such as a car is an image processing device for taking an image of the face of the driver with an in-vehicle camera, which is arranged at a location capable of taking an image of the face of the driver, and performing image processing to detect the location of the facial contour and the eyes of the driver from an obtained image (see Patent Document 1, for example). By using such a device, it is also possible to construct a system for detecting the status of the driver and providing driving support such as warning depending on the status of the driver such as inattentive driving or drowsy driving. It should be noted that an automatic gain function of an in-vehicle camera is used for a certain level of adjustment so that the brightness of an image to be obtained by image pickup of the face of the driver becomes constant, as a state where outside light such as west sun streams down on the face of the driver in the vehicle arises in a complicated manner and the illuminance of the face of the driver is not constant during driving.

[Patent Document 1] Japanese Patent Application Laid-Open No. 2004-234367

DISCLOSURE OF THE INVENTION

Problems to be Solved by the Invention

However, although an automatic gain function can deal with a case where the face of the driver is irradiated uniformly with outside light such as sunlight or reflected light, the automatic gain function for adjusting the brightness of the entire image cannot deal with a local change in the illuminance when radiation of outside light is not uniform. For example, when a partial change arises, i.e. when only a left half of the face is irradiated with sunlight, there is a problem that it is impossible to identify a dark part which is not irradiated with sunlight as the face and false detection arises, i.e., only a bright part is detected as the facial contour. As described above, since a light ray for irradiating the face of the driver in a running vehicle constantly changes, there is a problem that a sufficient accuracy cannot be obtained in detection of the face or each part of the face unless a judgment is made comprehensively in diversified methods.

The present invention has been made in view of such circumstances, and it is the main object thereof to provide: an image processing method for detecting a plurality of locations in the vertical direction as candidates during image pickup in detection of a detection object such as the nose of a person from an image obtained by a process such as image pickup, detecting a range to be a candidate of a detection object on the basis of the brightness of a pixel for each of rows of pixels lined up in the horizontal direction corresponding to each detected location and specifying a detection object from candidates of a detection object on the basis of the length of a detected range, so as to diversify a detection method and enhance the detection accuracy; an image processing device to which the image processing method is applied; an image processing system comprising the image processing device; and a computer program for realizing the image processing device.

Furthermore, another object of the present invention is to provide an image processing method, an image processing device, an image processing system and a computer program for detecting a detection object from the result of addition based on the brightness of each other adjoining pixel to the brightness of one pixel and subtraction based on the brightness of pixels located at a predetermined distance in the horizontal direction and the vertical direction during image pickup from said one pixel, so as to diversify a detection method and enhance the detection accuracy.

Moreover, yet another object of the present invention is to provide an image processing method, an image processing device, an image processing system and a computer program for detecting a detection object as a range in the horizontal direction based on the result of integration in the vertical direction of changes in the brightness of pixels lined up in the horizontal direction during image pickup and a range in the vertical direction based on the result of integration in the horizontal direction of changes in the brightness of pixels lined up in the vertical direction, so as to diversify a detection method and enhance the detection accuracy.

In addition, yet another object of the present invention is to provide an image processing method, an image processing device, an image processing system and a computer program for deciding the priority of a detection method on the basis of a mean value and a variance value of the brightness in order to select an effective detection method depending on the situation, so as to enhance the detection accuracy.

Means for Solving the Problems

An image processing method according to the first aspect is an image processing method for detecting a specific detection object from a two-dimensional image in which pixels are lined up in a first direction and a second direction that are different from each other, characterized by comprising the steps of: integrating brightness of pixels lined up in the first direction and deriving a change in an integrated value in the second direction; detecting a plurality of locations in the second direction as locations corresponding to candidates of a detection object on the basis of the derived change in an integrated value; detecting a range in the first direction based on brightness of a pixel as a candidate of a detection object for each of rows of pixels lined up in the first direction corresponding to each detected location; and specifying a detection object from candidates of a detection object on the basis of length of the detected range.

An image processing method according to the second aspect is an image processing method for detecting a specific detection object from a two-dimensional image in which pixels are lined up in a first direction and a second direction that are different from each other, characterized by comprising the steps of: converting brightness of one pixel on the basis of a result of addition based on brightness of each other adjoining pixel and subtraction based on brightness of a pixel located at a predetermined distance in the first direction and brightness of a pixel located at a predetermined distance in the second direction from said one pixel; and detecting a detection object on the basis of a result of conversion.

An image processing method according to the third aspect is an image processing method for detecting a specific detection object from a two-dimensional image in which pixels are lined up in a first direction and a second direction that are different from each other, characterized by comprising the steps of: integrating numerical values, in the second direction, based on a change in brightness of pixels lined up in the first direction and deriving a change in an integrated value in the first direction; integrating numerical values, in the first direction, based on a change in brightness of pixels lined up in the second direction and deriving a change in an integrated value in the second direction; and detecting a detection object on the basis of a range in the first direction based on the derived change in an integrated value in the first direction and a range in the second direction based on the derived change in an integrated value in the second direction.

An image processing method according to the fourth aspect is an image processing method for detecting a specific detection object from a two-dimensional image including a plurality of pixels by a plurality of detection methods, characterized by comprising the steps of: computing a mean value of brightness of a pixel; computing a variance value of brightness of a pixel; and deciding priority of a detection method on the basis of the computed mean value and variance value.

An image processing device according to the fifth aspect is an image processing device for detecting a specific detection object from a two-dimensional image in which pixels are lined up in a first direction and a second direction that are different from each other, characterized by comprising: deriving means for integrating brightness of pixels lined up in the first direction and deriving a change in an integrated value in the second direction; candidate detecting means means for detecting a plurality of locations in the second direction as locations corresponding to candidates of a detection object on the basis of the derived change in an integrated value; range detecting means for detecting a range in the first direction based on brightness of a pixel as a candidate of a detection object for each of rows of pixels lined up in the first direction corresponding to each detected location; and specifying means for specifying a detection object from candidates of a detection object on the basis of length of the detected range.

An image processing device according to the sixth aspect is the one according to the fifth aspect, characterized in that the candidate detecting means is constructed to detect a plurality of locations for which a change in an integrated value of brightness of pixels integrated in the first direction indicates a local minimum value.

An image processing device according to the seventh aspect is the one according to the sixth aspect, characterized by comprising means for obtaining a quadratic differential value of the change in an integrated value derived by the deriving means, wherein the candidate detecting means is constructed to detect a predetermined number of locations in a plurality of locations indicating a local minimum value, on the basis of a result of quadratic differential.

An image processing device according to the eighth aspect is the one according to any one of the fifth aspect to the seventh aspect, characterized in that the range detecting means is constructed to detect a range on the basis of a change in brightness of pixels lined up in the first direction.

An image processing device according to the ninth aspect is the one according to any one of the fifth aspect to the eighth aspect, characterized by further comprising means for detecting a range in the first direction of a detection area which includes a detection object and has a range in the first direction larger than a detection object, wherein the specifying means is constructed to specify a detection object on the basis of a result of comparison between length of a range in the first direction of a candidate of a detection object detected by the range detecting means and length of a range in the first direction of a detection area including a detection object.

An image processing device according to the tenth aspect is the one according to any one of the fifth aspect to the ninth aspect, characterized by further comprising: means for integrating brightness of pixels lined up in the second direction according to the specified detection object and deriving a change in an integrated value in the first direction; local minimum value detecting means for detecting a local minimum value from a change in an integrated value in the first direction; means for counting the number of detected local minimum values; and means for determining that the specified detection object is false when the counted number is smaller than a predetermined number.

An image processing device according to the eleventh aspect is the one according to the tenth aspect, characterized by further comprising means for determining that the specified detection object is false when the number of continuous pixels in the second direction, which include a pixel corresponding to the local minimum value detected by the local minimum value detecting means and have brightness equal to said pixel, is larger than a predetermined number.

An image processing device according to the twelfth aspect is an image processing device for detecting a specific detection object from a two-dimensional image in which pixels are lined up in a first direction and a second direction that are different from each other, characterized by comprising: means for converting brightness of one pixel on the basis of a result of addition based on brightness of each other adjoining pixel and subtraction based on brightness of a pixel located at a predetermined distance in the first direction and brightness of a pixel located at a predetermined distance in the second direction from said one pixel; and detecting means for detecting a detection object on the basis of a result of conversion.

An image processing device according to the thirteenth aspect is the one according to the twelfth aspect, characterized in that the detecting means is constructed to detect a pixel having a minimum converted value as a detection object.

An image processing device according to the fourteenth aspect is an image processing device for detecting a specific detection object from a two-dimensional image in which pixels are lined up in a first direction and a second direction that are different from each other, characterized by comprising: first deriving means for integrating numerical values, in the second direction, based on a change in brightness of pixels lined up in the first direction and deriving a change in an integrated value in the first direction; second deriving means for integrating numerical values, in the first direction, based on a change in brightness of pixels lined up in the second direction and deriving a change in an integrated value in the second direction; and detecting means for detecting a detection object on the basis of a range in the first direction based on the change in an integrated value in the first direction derived by the first deriving means and a range in the second direction based on the change in an integrated value in the second direction derived by the second deriving means.

An image processing device according to the fifteenth aspect is the one according to the fourteenth aspect, characterized in that the first deriving means is constructed to integrate indexes, in the second direction, based on a numerical value based on a brightness difference from an adjoining pixel in the first direction and a numerical value indicating a low level of brightness of an adjoining pixel in the first direction and derive a change in an integrated value in the first direction, the second deriving means is constructed to integrate indexes, in the first direction, based on a numerical value based on a brightness difference from an adjoining pixel in the second direction and a numerical value indicating a low level of brightness of an adjoining pixel in the second direction and derive a change in an integrated value in the second direction, and the detecting means is constructed to detect a detection object on the basis of a range in the first direction from a location where the integrated value derived by the first deriving means becomes maximum to a location where the integrated value derived by the first deriving means becomes minimum and a range in the second direction from a location where the integrated value derived by the second deriving means becomes maximum to a location where the integrated value derived by the second deriving means becomes minimum.

An image processing device according to the sixteenth aspect is an image processing device for detecting a specific detection object from a two-dimensional image including a plurality of pixels by a plurality of detection methods, characterized by comprising: means for computing a mean value of brightness of a pixel; means for computing a variance value of brightness of a pixel; and means for deciding priority of a detection method on the basis of the computed mean value and variance value.

An image processing system according to the seventeenth aspect is characterized by comprising: an image processing device described in any one of the fifth aspect to the sixteenth aspect; and an image pickup device for generating an image to be processed by the image processing device, wherein the detection object is an area including nares of a person in an image taken by the image pickup device, the first direction is a horizontal direction, and the second direction is a vertical direction.

A computer program according to the eighteenth aspect is a computer program for causing a computer to detect a specific detection object from a two-dimensional image in which pixels are lined up in a first direction and a second direction that are different from each other, characterized by running: a procedure of causing a computer to integrate brightness of pixels lined up in the first direction and derive a change in an integrated value in the second direction; a procedure of causing a computer to detect a plurality of locations in the second direction as locations corresponding to candidates of a detection object on the basis of the derived change in an integrated value; a procedure of causing a computer to detect a range in the first direction based on brightness of a pixel as a candidate of a detection object for each of rows of pixels lined up in the first direction corresponding to each detected location; and a procedure of causing a computer to specify a detection object from candidates of a detection object on the basis of length of the detected range.

A computer program according to the nineteenth aspect is a computer program for causing a computer to detect a specific detection object from a two-dimensional image in which pixels are lined up in a first direction and a second direction that are different from each other, characterized by running: a procedure of causing a computer to convert brightness of one pixel on the basis of a result of addition based on brightness of each other adjoining pixel and subtraction based on brightness of a pixel located at a predetermined distance in the first direction and brightness of a pixel located at a predetermined distance in the second direction from said one pixel; and a procedure of causing a computer to detect a detection object on the basis of a result of conversion.

A computer program according to the twentieth aspect is a computer program for causing a computer to detect a specific detection object from a two-dimensional image in which pixels are lined up in a first direction and a second direction that are different from each other, characterized by running: a procedure of causing a computer to integrate numerical values, in the second direction, based on a change in brightness of pixels lined up in the first direction and derive a change in an integrated value in the first direction; a procedure of causing a computer to integrate numerical values, in the first direction, based on a change in brightness of pixels lined up in the second direction and derive a change in an integrated value in the second direction; and a procedure of causing a computer to detect a detection object on the basis of a range in the first direction based on the derived change in an integrated value in the first direction and a range in the second direction based on the derived change in an integrated value in the second direction.

A computer program according to the twenty first aspect is a computer program for causing a computer to detect a specific detection object from a two-dimensional image including a plurality of pixels by a plurality of detection methods, characterized by running: a procedure of causing a computer to compute a mean value of brightness of a pixel; a procedure of causing a computer to compute a variance value of brightness of a pixel; and a procedure of causing a computer to decide priority of a detection method on the basis of the computed mean value and variance value.

In the first aspect, the fifth aspect, the sixth aspect, the seventh aspect and the eighteenth aspect, when the detection object is, for example, an area including nares in the face of a person to right and left nostrils in a taken image and the first direction and the second direction are respectively the horizontal direction and the vertical direction, it is possible to detect a detection object with a high degree of accuracy by focusing on the brightness distribution in the vertical direction, detecting a plurality of candidates including even eyebrows, eyes and a mouth and specifying a detection object from candidates on the basis of the width in the horizontal direction. Especially, when being used in combination with another method for detecting a detection object on the basis of the brightness distribution in the horizontal direction, it is possible to further enhance the detection accuracy since it is possible to diversify a detection method and judge the location of the detection object comprehensively.

In the eighth aspect, it is possible to clarify a difference in the range in the horizontal direction between an area including nares and other part and enhance the detection accuracy, by detecting a range on the basis of the brightness of pixels lined up in the horizontal direction from a plurality of candidates including parts such as eyebrows, eyes and a mouth.

In the ninth aspect, it is possible to enhance the detection accuracy by detecting the width of the face, which is a detection area including nares that is a detection object, and specifying a candidate, for which comparison to the width of the face, e.g. a range in the horizontal direction to the width of the face, is 22% -43%, as a detection object, since it is possible to clearly distinguish from other parts such as eyebrows, eyes and a mouth.

In the tenth aspect, it is possible to reduce the possibility of false detection of judging a part other than nares as nares, by determining that the possibility of nares is low and a detection object is not detected when the number of local minimum values in the horizontal direction, i.e. the number of parts having high possibility of nares, is smaller than a predetermined number such as two which is set for right and left nares.

In the eleventh aspect, it is possible to reduce the possibility of false detection, by determining that it is highly possible that an eyeglass frame is detected and a detection object is not detected when the continuity in the vertical direction is larger than a threshold indicated by a predetermined number.

In the second aspect, the twelfth aspect, the thirteenth aspect and the nineteenth aspect, when the detection object is, for example, nares in the face of a person in a taken image and the first direction and the second direction are respectively the horizontal direction and the vertical direction, it is possible to detect a detection object with a high degree of accuracy by performing a conversion process for emphasizing a part, for which adjoining pixels have low brightness and the surrounding thereof has high brightness, i.e., a small area having low brightness. Especially, when being used in combination with another method for detecting a detection object, it is possible to further enhance the detection accuracy since it is possible to diversify a detection method and judge the location of the detection object comprehensively.

In the third aspect, the fourteenth aspect, the fifteenth aspect and the twentieth aspect, when the detection object is, for example, an area surrounding nares in the face of a person in a taken image and the first direction and the second direction are respectively the horizontal direction and the vertical direction, it is possible to detect a detection object with a high degree of accuracy by deriving a numerical value, which becomes large at a position where the descent of the brightness is large and becomes small at a position where the ascent of the brightness is large, for each of the vertical direction and the horizontal direction and detecting a detection object which is a quadrangular area having lower brightness than the surrounding on the basis of the derived numerical value. Especially, since detected is not nares themselves but a downside area surrounding nares, it is possible to detect a detection object even when the face is inclined at an angle which makes detection of nares difficult. Especially, when being used in combination with another method, it is possible to further enhance the detection accuracy since it is possible to diversify a detection method and judge the location of the detection object comprehensively. Moreover, when a part such as the location of eyes or the location of a nose is detected by another method, it is possible to detect a detection object with a higher degree of accuracy by performing detection according to the present invention after narrowing down an area on the basis of the positional relationship to the detected part.

In the fourth aspect, the sixteenth aspect and the twenty first aspect, when a detection object such as, for example, nares in the face of a person is detected in a taken image, it is possible to further enhance the detection accuracy by determining whether a local change in the illuminance is generated in the face of a person or not on the basis of a mean value and a variance value of the brightness and deciding the priority of a detection method depending on the determined situation, since a highly reliable detection method and detection priority depending on the situation can be selected from a variety of detection methods.

The seventeenth aspect, which can detect an area including nares of a person with a high degree of accuracy, can be applied to, for example, a system for detecting the face of the driver as a detection object from an image obtained by image pickup of the face of the driver with an image pickup device such as an in-vehicle camera mounted on a vehicle and developed to a system for detecting the status of the driver and providing driving support such as warning to inattentive driving.

Effects of the Invention

An image processing method, an image processing device, an image processing system and a computer program according to the present invention are applied, for example, to an embodiment for a detection object of an area including nares in the face of a person to right and left nostrils from an image obtained by image pickup of the face of the driver with an image pickup device such as an in-vehicle camera mounted on a vehicle. In addition, an image processing device and the like according to the present invention integrate the brightness of pixels lined up in the horizontal direction, which is the first direction, and derive a change in an integrated value in the vertical direction, which is the second direction; detect a plurality of locations to be a local minimum value from a change in the derived integrated value as candidates including a detection object; obtain a quadratic differential value of a change in an integrated value and further narrow down candidates therefrom to a predetermined number; detect a range in the first direction to be a candidate of a detection object on the basis of the brightness of a pixel for each of rows of pixels lined up in the first direction corresponding to each narrowed-down location; and specify a detection object from candidates of a detection object on the basis of the length of the detected range.

With this structure, the present invention guarantees beneficial effects such as detection of a detection object with a high degree of accuracy by focusing on the brightness distribution in the vertical direction, detecting a plurality of candidates including even eyebrows, eyes and a mouth having low brightness and specifying a detection object from candidates on the basis of the width in the horizontal direction. Especially, when being used in combination with another method for detecting a detection object on the basis of the brightness distribution in the horizontal direction, the present invention guarantees beneficial effects such as further enhancement of the detection accuracy since it is possible to diversify a detection method and judge the location of the detection object comprehensively.

In addition, when being applied to a system for precisely detecting the status of the driver and providing driving support such as warning to inattentive driving by enhancing the accuracy of detection of a detection object, the present invention guarantees beneficial effects such as construction of a reliable driving support system which makes less false detection even in driving in an environment wherein the status of outside light constantly changes.

Moreover, an image processing device and the like according to the present invention guarantee beneficial effects such as detection to clarify a difference of a range in the horizontal direction between an area including nares and other parts such as eyebrows, eyes and a mouth and enhancement of the detection accuracy as a result, by detecting a range on the basis of a change in the brightness of pixels lined up in the first direction in detection of a range to be a candidate of a detection object from pixel rows lined up in the horizontal direction which is the first direction, and in particular, by detecting a range on the basis of the result of detection of both ends of pixel rows having low brightness lined up in the first direction by a filtering process for emphasizing a position where the brightness in the horizontal direction rapidly changes.

Furthermore, an image processing device and the like according to the present invention guarantee beneficial effects such as enhancement of the detection accuracy by detecting the width of the face and specifying a candidate, for which comparison to the width of the face, e.g. a range in the horizontal direction to the width of the face, is 22% -43%, as a detection object, since it is possible to clearly distinguish from other parts such as eyebrows, eyes and a mouth.

In addition, an image processing device and the like according to the present invention guarantee beneficial effects such as reduction of the possibility of false detection of judging a part other than nares as nares, by determining that the possibility of nares is low and a detection object is not detected when the number of parts having lower brightness than the surrounding, for which an integrated value of the brightness in the vertical direction according to a detection object becomes a local minimum value, i.e. the number of parts having high possibility of nares, in a row of pixels lined up in the horizontal direction included in a specified detection object is smaller than a predetermined number, i.e. two, which indicates the number of right and left nares, even when a detection object can be specified.

Furthermore, an image processing device and the like according to the present invention guarantee beneficial effects such as reduction of the possibility of false detection by judging that it is highly possible that an eyeglass frame is detected and a detection object is not detected when the number of pixels lined up in the vertical direction is larger than a predetermined number.

An image processing method, an image processing device, an image processing system and a computer program according to the present invention are applied, for example, to an embodiment for a detection object of nares in the face of a person from an image obtained by image pickup of the face of the driver with an image pickup device such as an in-vehicle camera mounted on a vehicle. In addition, an image processing device and the like according to the present invention convert the brightness of one pixel on the basis of the result of addition based on the brightness of each other adjoining pixel and subtraction based on the brightness of a pixel located at a predetermined distance in the horizontal direction, which is the first direction, and a pixel located at a predetermined distance in the vertical direction, which is the second direction, from the location of said one pixel; and detect a pixel having a minimum converted value as a detection object.

With this structure, the present invention guarantees beneficial effects such as detection of nares, which are a small area having low brightness, with a high degree of accuracy by performing a conversion process for emphasizing a part, for which adjoining pixels have low brightness and the surrounding thereof has high brightness, i.e., a small area having low brightness. Especially, when the present invention which can detect nares with a high degree of accuracy while the face is turned up is used in combination with another method for detecting a detection object, the present invention guarantees beneficial effects such as further enhancement of the detection accuracy since it is possible to diversify a detection method and judge the location of the detection object comprehensively.

In addition, when being applied to a system for precisely detecting the status of the driver and providing driving support such as warning to inattentive driving by enhancing the accuracy of detection of a detection object, the present invention guarantees beneficial effects such as construction of a reliable driving support system which makes less false detection even in driving in an environment wherein the status of outside light constantly changes.

An image processing method, an image processing device, an image processing system and a computer program according to the present invention are applied, for example, to an embodiment for a detection object of a downside area surrounding nares in the face of a person from an image obtained by image pickup of the face of the driver with an image pickup device such as an in-vehicle camera mounted on a vehicle. In addition, an image processing device and the like according to the present invention integrate indexes, which are obtained by multiplying a numerical value based on a brightness difference from an adjoining pixel in the horizontal direction that is the first direction by a numerical value indicative of a low level of brightness of an adjoining pixel in the first direction, in the vertical direction which is the second direction and derive a change in an integrated value in the first direction; integrate indexes, which are obtained by multiplying a numerical value based on a brightness difference from an adjoining pixel in the second direction by a numerical value indicative of a low level of brightness of an adjoining pixel in the second direction, in the first direction and derive a change in an integrated value in the second direction; and detect a detection object on the basis of a range in the first direction and a range in the second direction from a location where the derived integrated values respectively become maximum to a location where the derived integrated values respectively become minimum.

With this structure, the present invention guarantees beneficial effects such as detection of a detection object with a high degree of accuracy since a numerical value which becomes large at a position where the descent of the brightness is large and becomes small at a position where the ascent of the brightness is large is derived for each of the horizontal direction and the vertical direction and a detection object which is a quadrangular area having lower brightness than the surrounding is detected on the basis of the derived numerical value. Especially, since detected is not nares themselves but a downside area surrounding nares as a quadrangular area having lower brightness than the surrounding, the present invention guarantees beneficial effects such as detection of a detection object even when the face is inclined at an angle which makes detection of nares difficult. Furthermore, when a part such as the location of eyes and the location of a nose is detected by another method, the present invention guarantees beneficial effects such as detection of a detection object with a higher degree of accuracy by performing detection according to the present invention after narrowing down an area on the basis of the positional relationship to the detected part. Accordingly, when being used in combination with another method for detecting a detection object, the present invention guarantees beneficial effects such as further enhancement of the detection accuracy since it is possible to diversify a detection method and judge the location of the detection object comprehensively.

In addition, when being applied to a system for precisely detecting the status of the driver and providing driving support such as warning to inattentive driving by enhancing the accuracy of detection of a detection object, the present invention guarantees beneficial effects such as construction of a reliable driving support system which makes less false detection even in driving in an environment wherein the status of outside light constantly changes.

An image processing method, an image processing device, an image processing system and a computer program according to the present invention are applied, for example, to an embodiment for a detection object of an area including nares in the face of a person from an image obtained by image pickup of the face of the driver with an image pickup device such as an in-vehicle camera mounted on a vehicle. In addition, an image processing device and the like according to the present invention compute a mean value of the brightness of a pixel, compute a variance value of the brightness of a pixel and decide the priority of a detection method from a plurality of detection methods on the basis of the computed mean value and variance value.

With this structure, the present invention guarantees beneficial effects such as further enhancement of the detection accuracy since it is possible to select a highly reliable detection method and detection priority depending on the situation from a variety of detection methods by determining whether a local change in the illuminance is generated in the face of a person or not on the basis of a mean value and a variance value of the brightness and deciding the priority of a detection method depending on the determined situation.

BRIEF DESCRIPTION OF THE DRAWINGS

Drawing 1 is a block diagram showing a structure example of an image processing system according to Embodiment 1 of the present invention;

Drawing 2 is a flow chart showing an example of a process of an image processing device to be used in an image processing system according to Embodiment 1 of the present invention;

Figure 2:
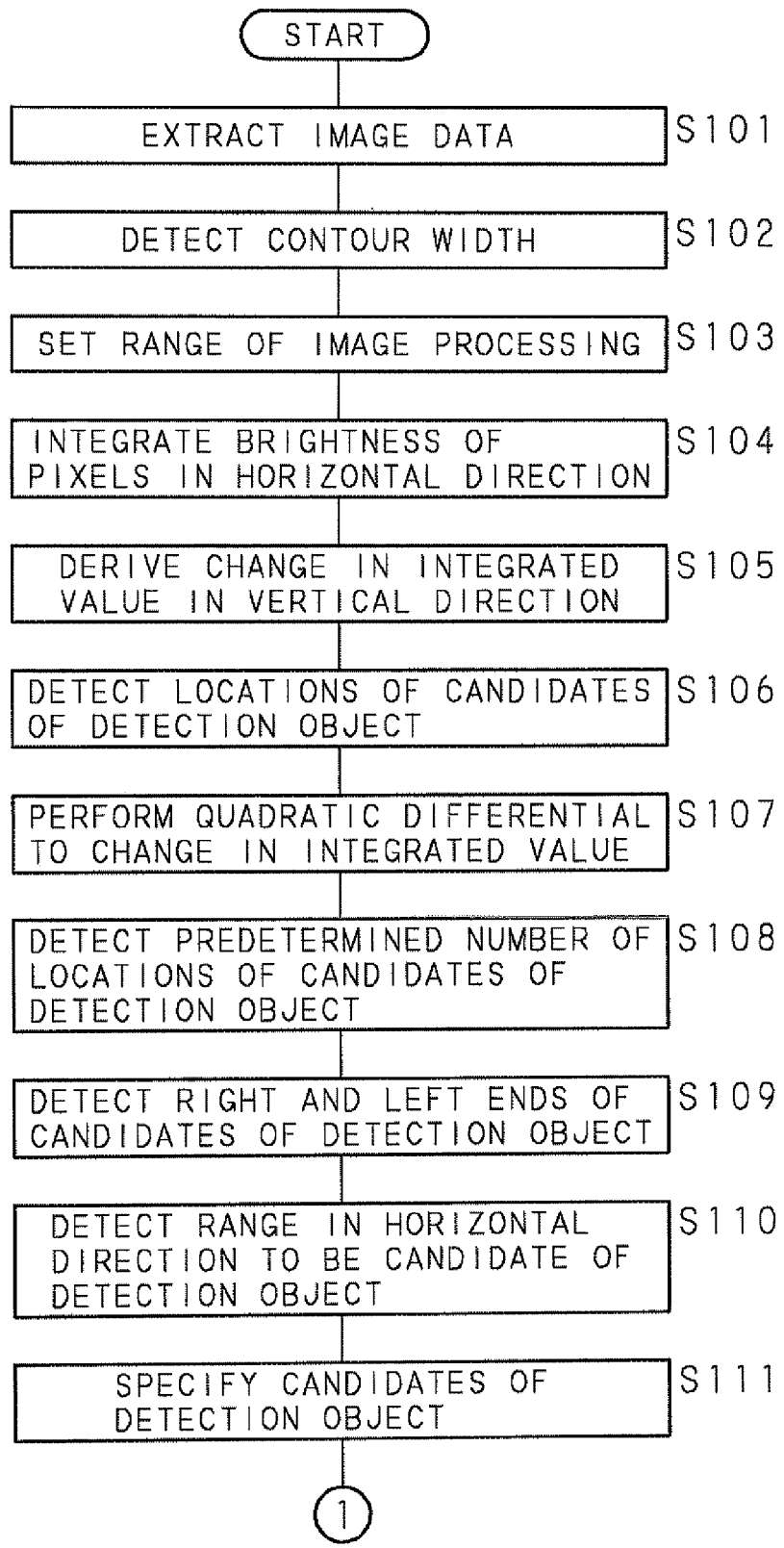
Figure 3:
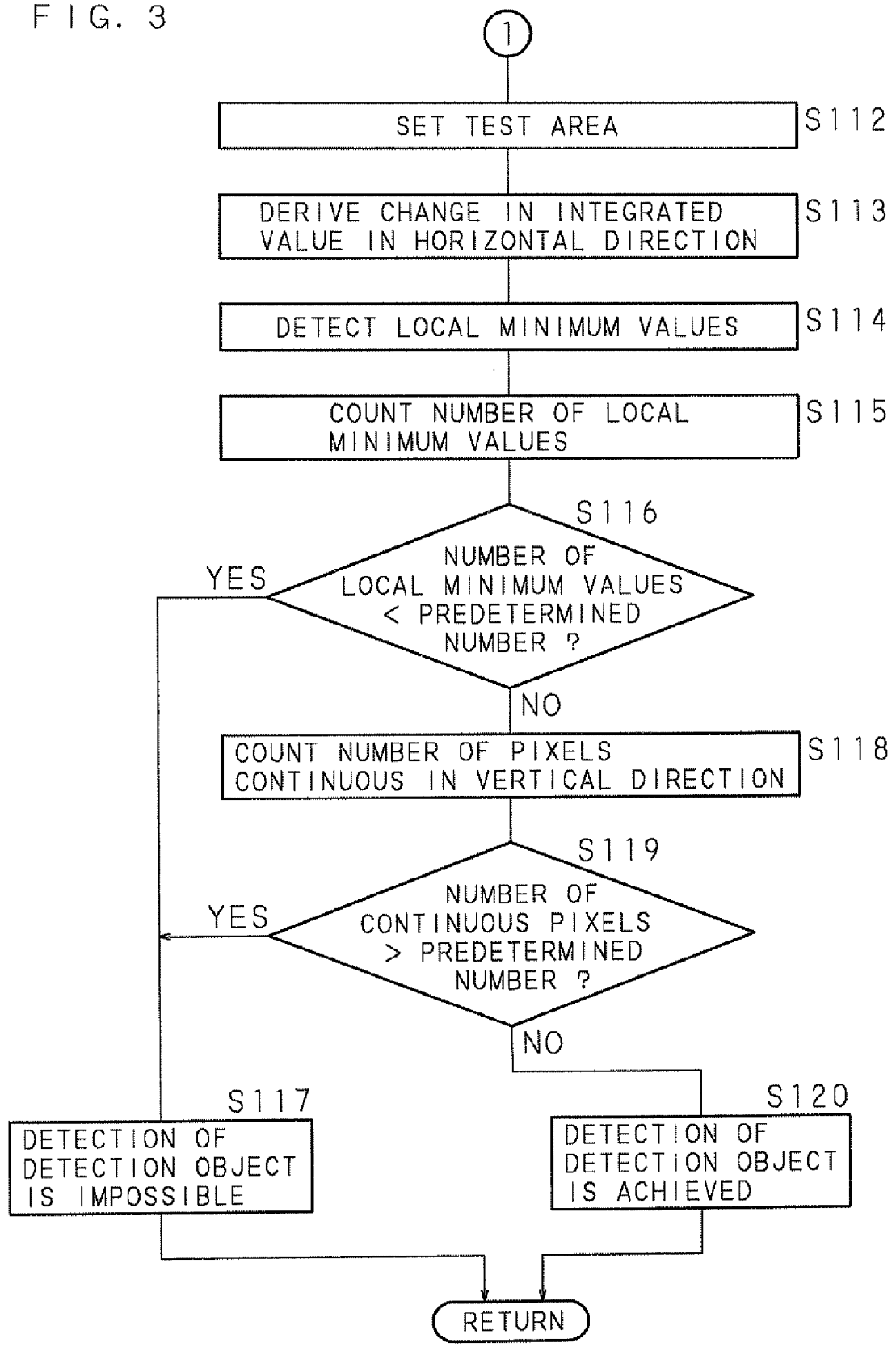
Figure 5:
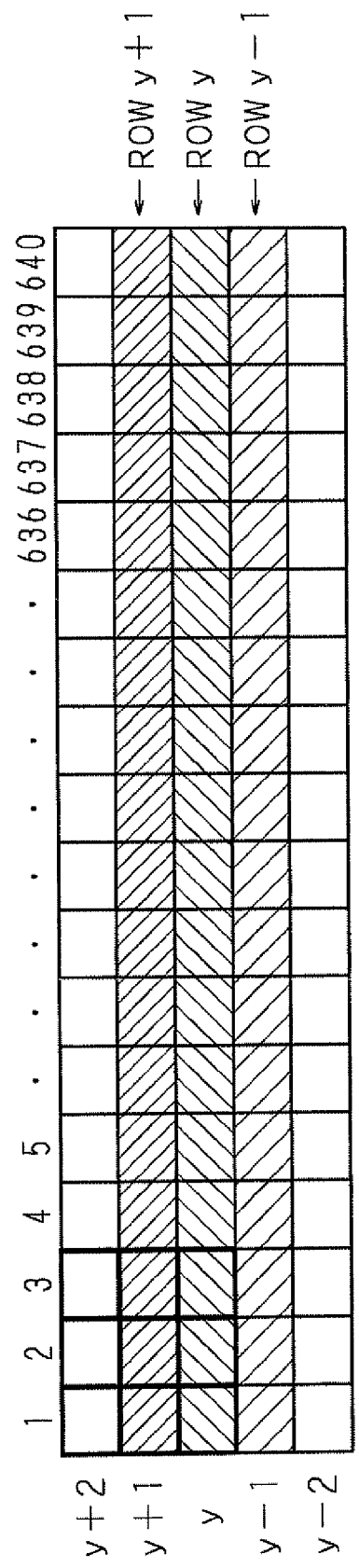
Figure 7:
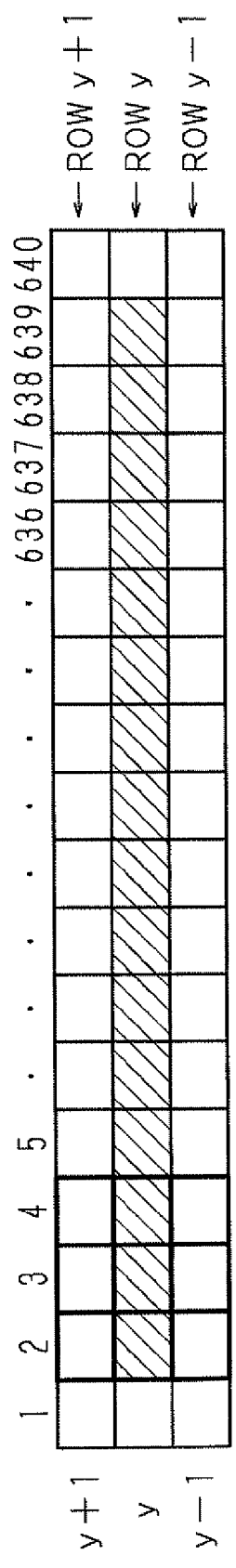
Figure 9:
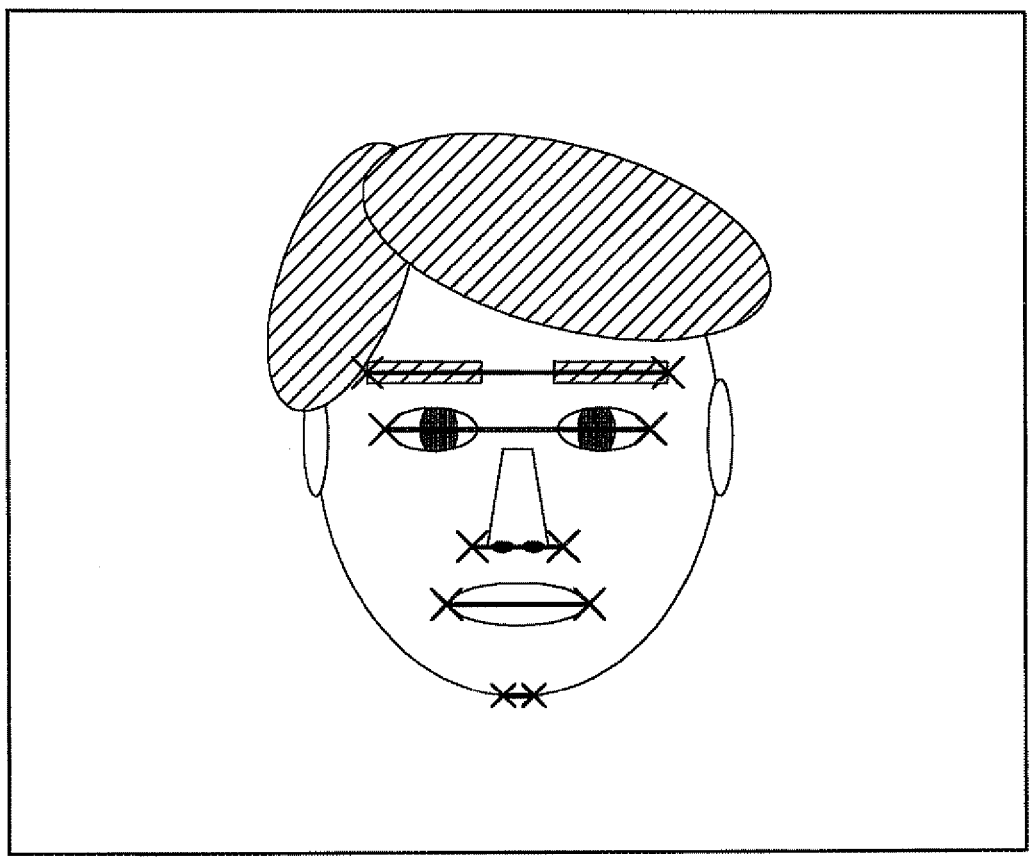
Figure 11:
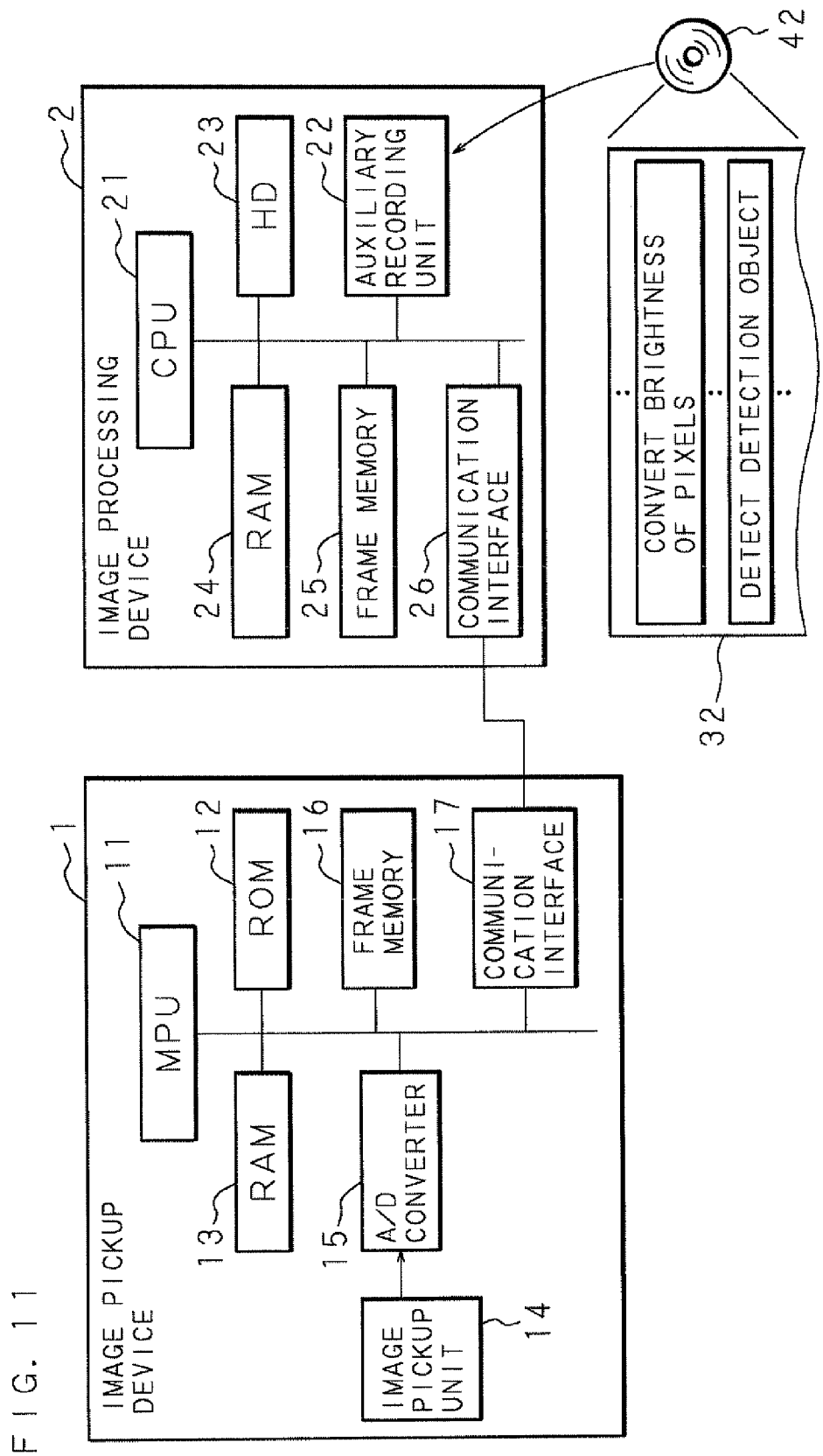
Figure 12:
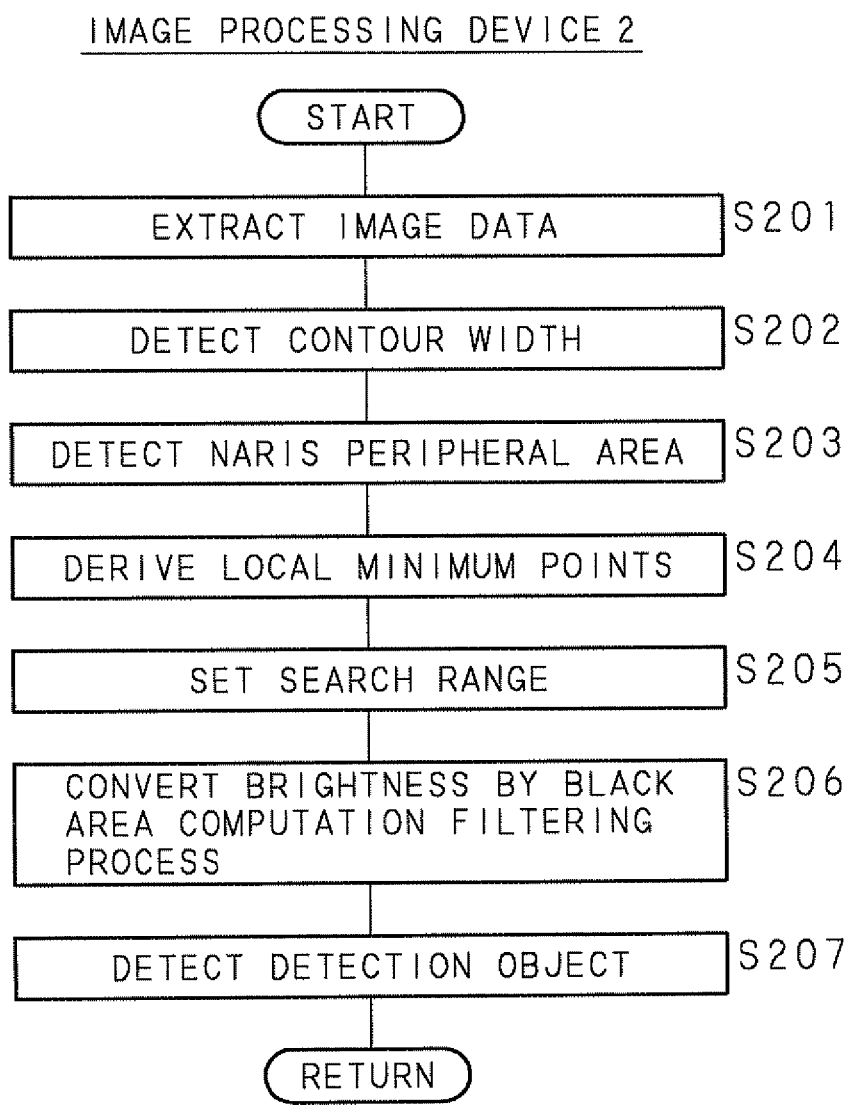
Figure 13:
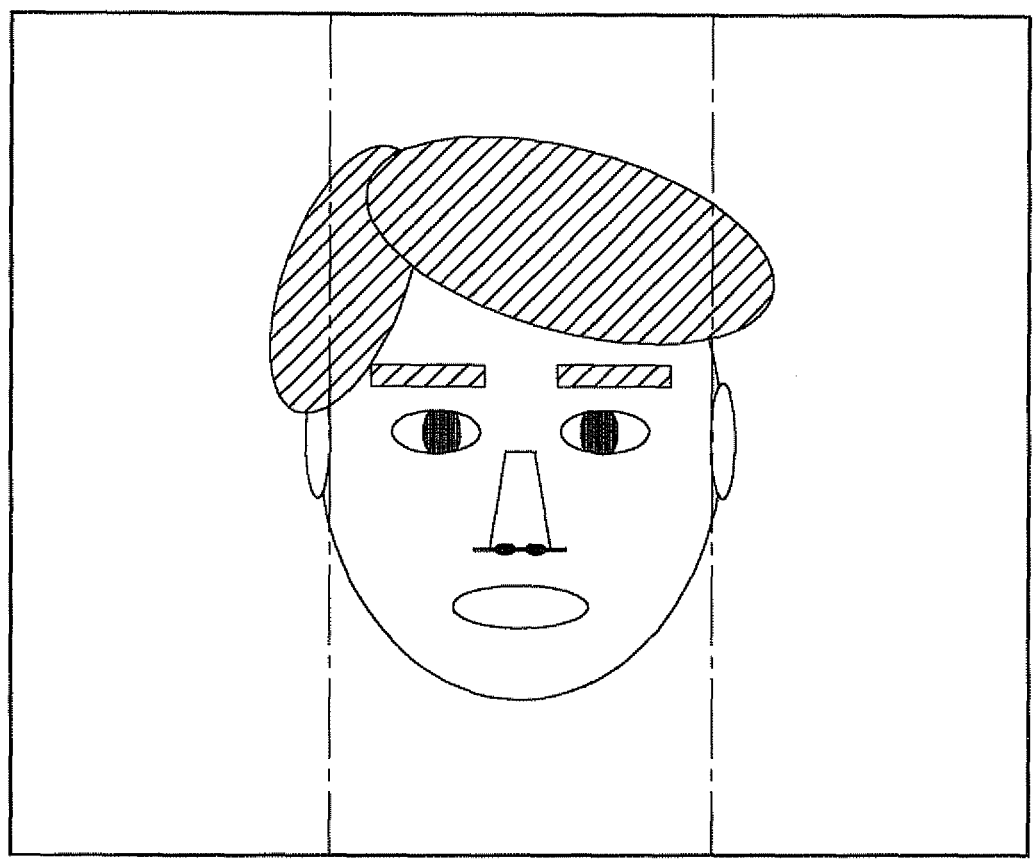
Figure 15:
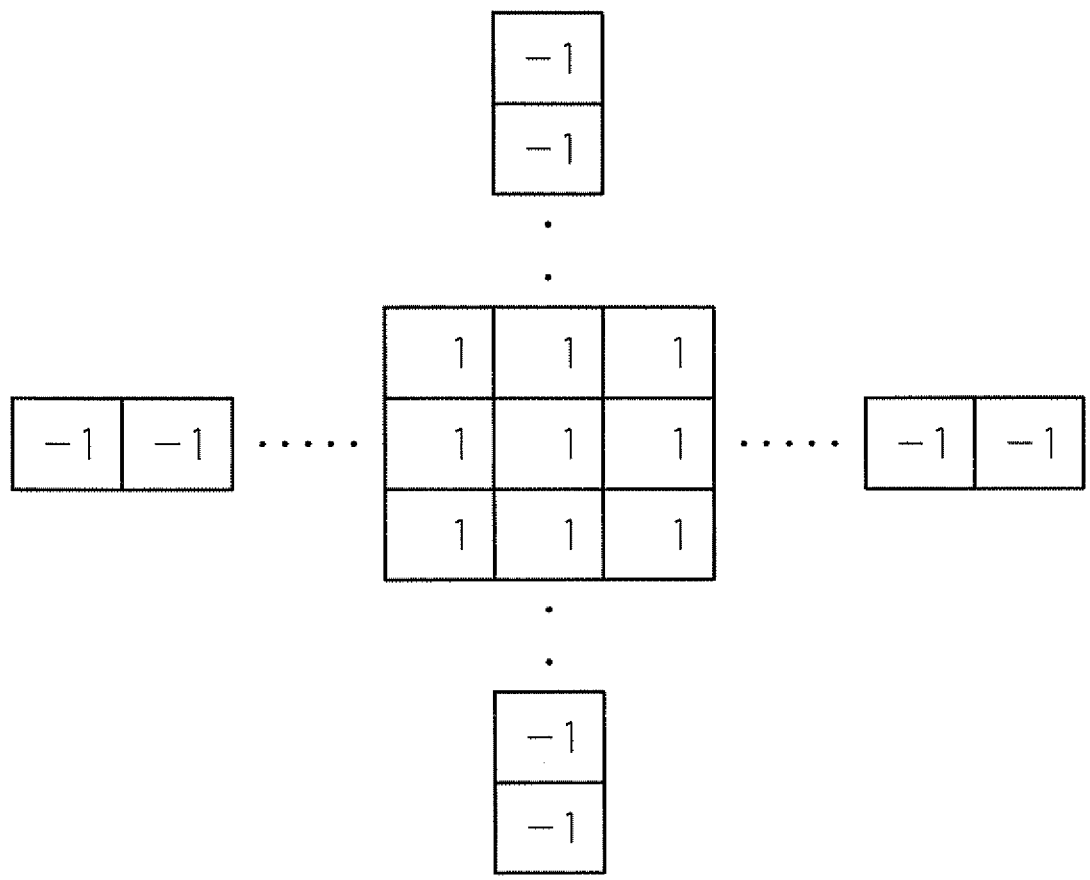
Figure 18:
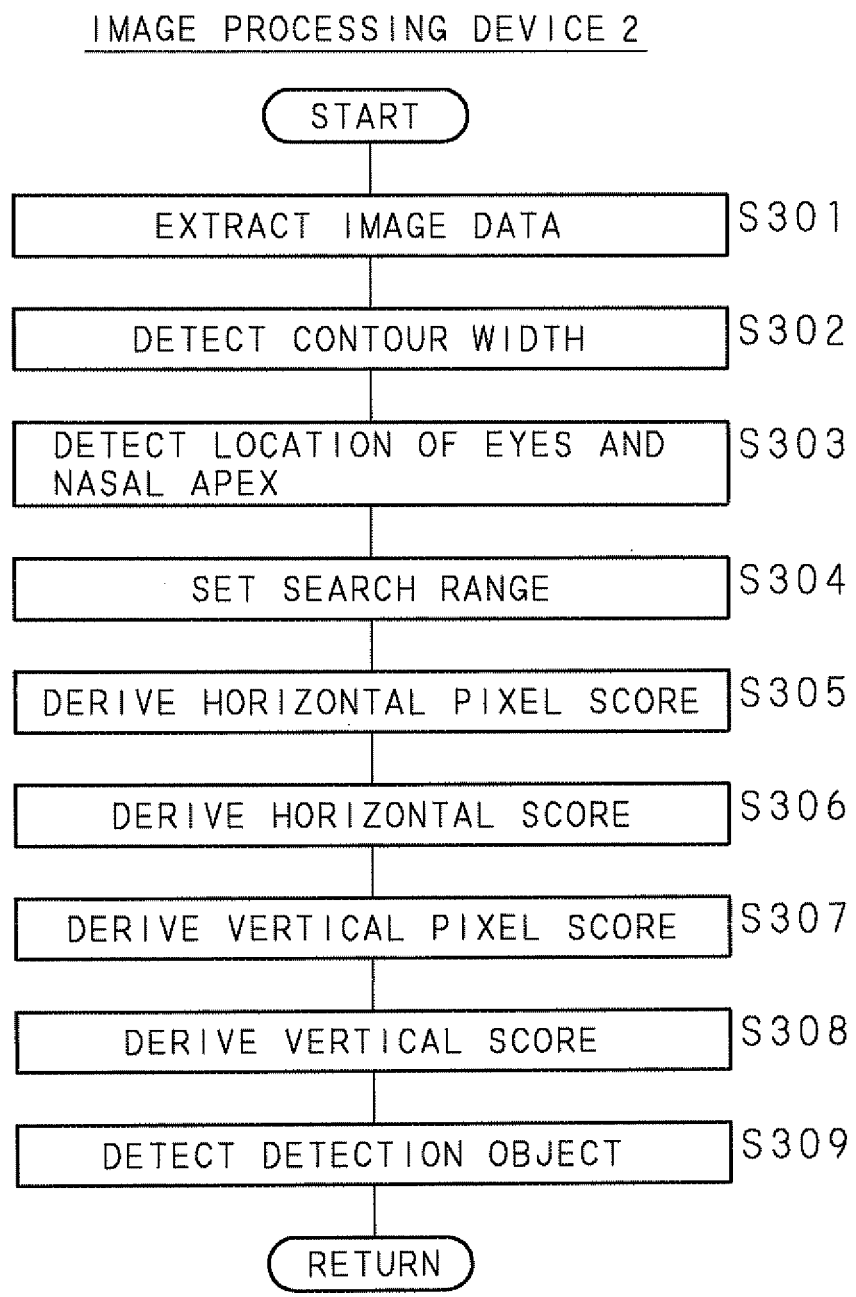
Figure 19:
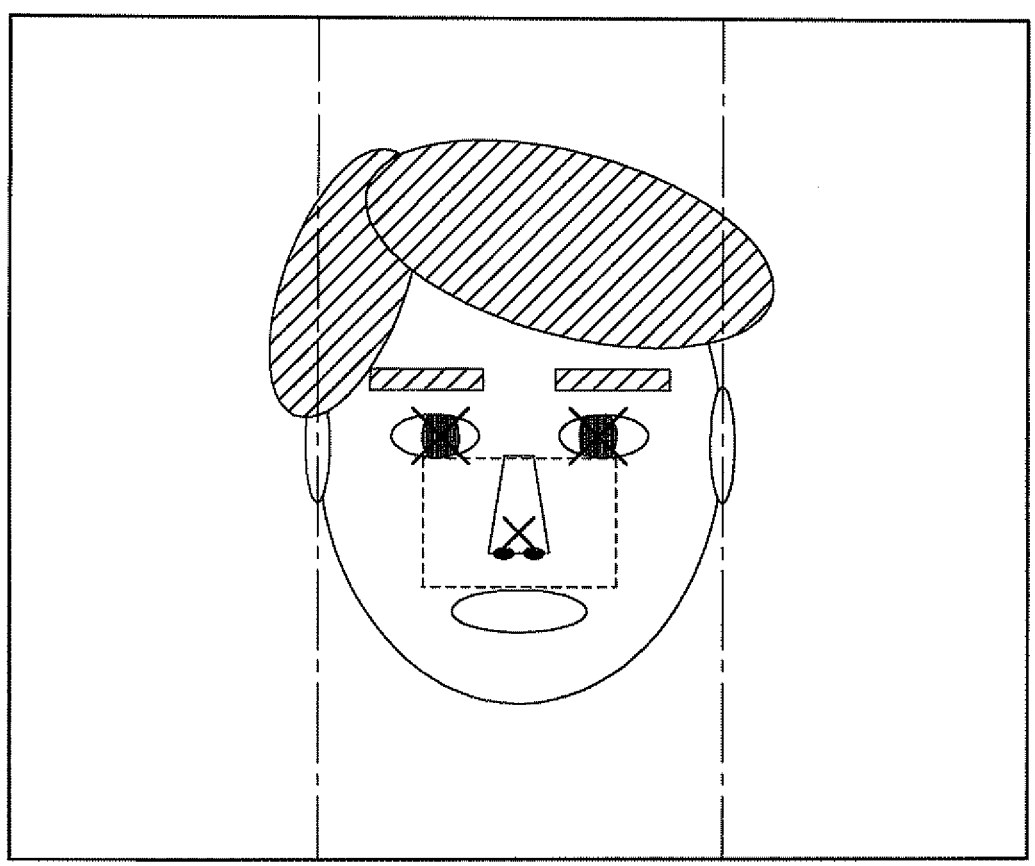
Figure 22:
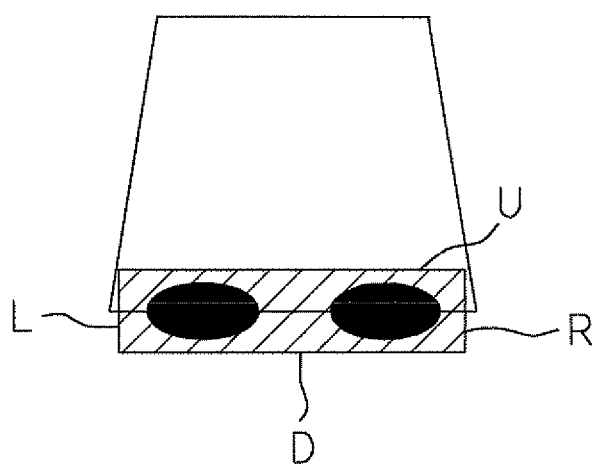
Figure 23:
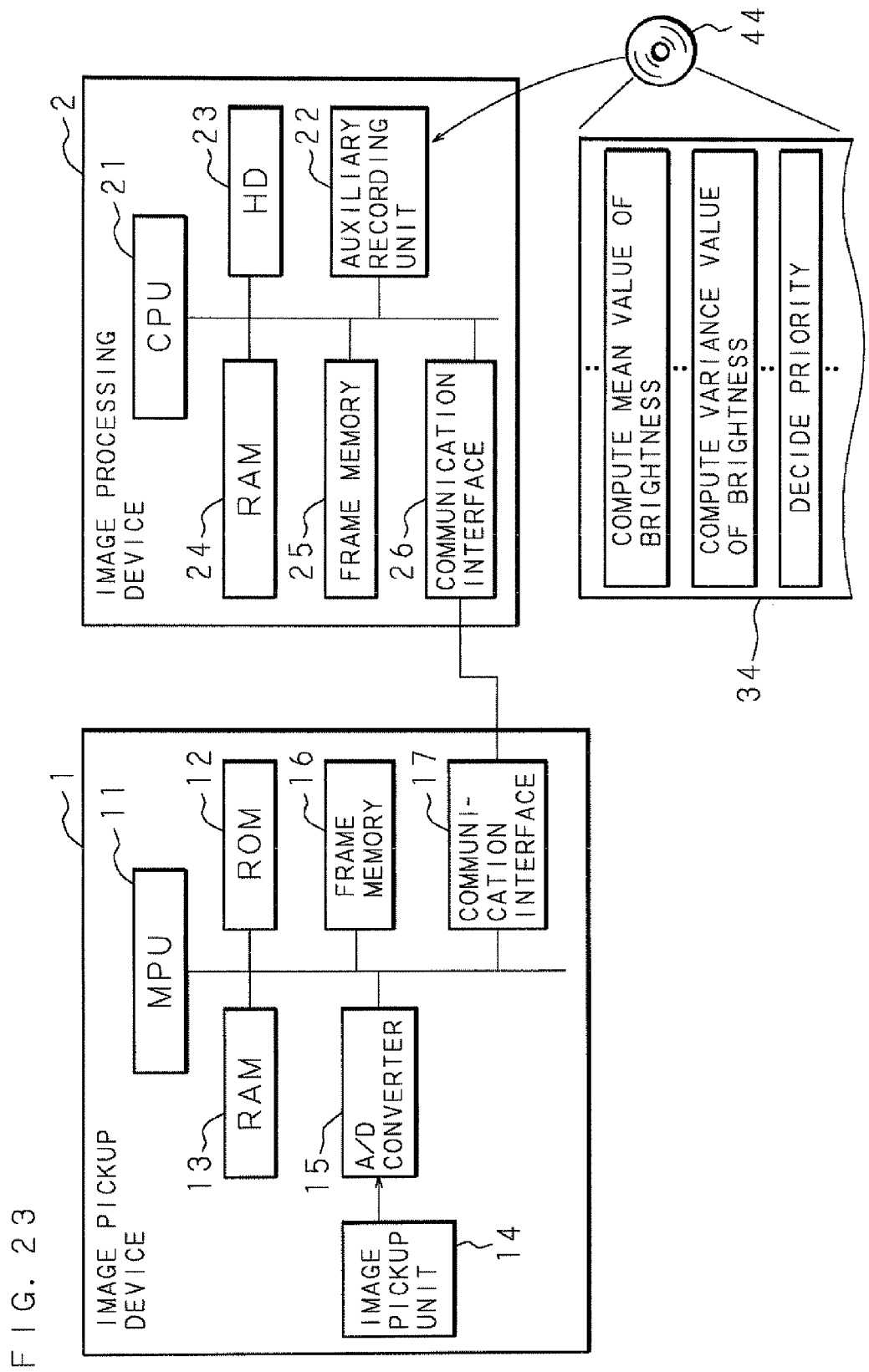
Figure 24:
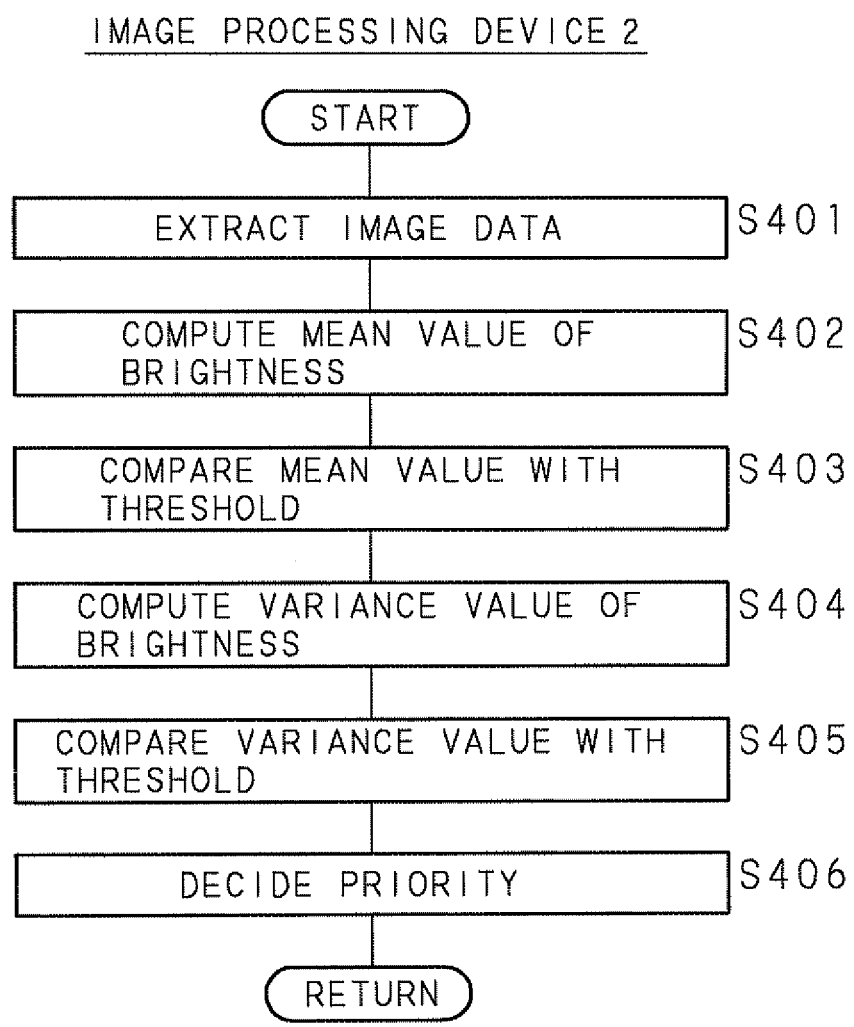

Drawing 3 is a flow chart showing an example of a process of an image processing device to be used in an image processing system according to Embodiment 1 of the present invention;

Drawing 4 is an explanatory view conceptually showing an example of a process from decision of a range to detection of a candidate of a detection object of a process of an image of an image processing system according to Embodiment 1 of the present invention;

Drawing 5 is an explanatory view schematically showing an example of a range for which an end detecting process of an image processing system according to Embodiment 1 of the present invention is performed;

Drawing 6 is an explanatory view showing an example of coefficients to be used in an end detecting process of an image processing system according to Embodiment 1 of the present invention;

Drawing 7 is an explanatory view schematically showing an example of a range for which an end detecting process of an image processing system according to Embodiment 1 of the present invention is performed;

Drawing 8 is an explanatory view schematically showing an example of a range for which an end detecting process of an image processing system according to Embodiment 1 of the present invention is performed;

Drawing 9 is an explanatory view showing candidates of a detection object of an image processing system according to Embodiment 1 of the present invention;

Drawing 10 is an explanatory view conceptually showing a naris area score of an image processing system according to Embodiment 1 of the present invention;

Drawing 11 is a block diagram showing a structure example of an image processing system according to Embodiment 2 of the present invention;

Drawing 12 is a flow chart showing an example of a process of an image processing device to be used in an image processing system according to Embodiment 2 of the present invention;

Drawing 13 is an explanatory view conceptually showing an example of setting of a detection range of an image processing system according to Embodiment 2 of the present invention;

Drawing 14 is an explanatory view conceptually showing an example of setting of a search range of an image processing system according to Embodiment 2 of the present invention;

Drawing 15 is an explanatory view showing an example of coefficients to be used in a black area computation filtering process of an image processing system according to Embodiment 2 of the present invention;

Drawing 16 is an explanatory view conceptually showing an example of detection using a black area computation filtering process of an image processing system according to Embodiment 2 of the present invention;

Drawing 17 is a block diagram showing a structure example of an image processing system according to Embodiment 3 of the present invention;

Drawing 18 is a flow chart showing an example of a process of an image processing device to be used in an image processing system according to Embodiment 3 of the present invention;

Drawing 19 is an explanatory view conceptually showing an example of setting of a search range of an image processing system according to Embodiment 3 of the present invention;

Drawing 20 is an explanatory view showing an example of coefficients to be used in a horizontal edge filtering process of an image processing system according to Embodiment 3 of the present invention;

Drawing 21 is an explanatory view showing an example of coefficients to be used in a vertical edge filtering process of an image processing system according to Embodiment 3 of the present invention;

Drawing 22 is an explanatory view showing a result of detection of an image processing system according to Embodiment 3 of the present invention;

Drawing 23 is a block diagram showing a structure example of an image processing system according to Embodiment 4 of the present invention; and Drawing 24 is a flow chart showing an example of a process of an image processing device 2 to be used in an image processing system according to Embodiment 4 of the present invention.

DESCRIPTION OF THE NUMERALS

1 Image Pickup Device
2 Image Processing Device
31, 32, 33, 34 Computer Program
41, 42, 43, 44 Record Medium

BEST MODE FOR IMPLEMENTING THE INVENTION

The following description will explain the present invention in detail with reference to the drawings illustrating some embodiments thereof.

Embodiment 1

Drawing 1 is a block diagram showing a structure example of an image processing system according to Embodiment 1 of the present invention. Denoted at 1 in Drawing 1 is an image pickup device such as an in-vehicle camera mounted on an vehicle, which is connected with an image processing device 2 for performing image processing via a communication network such as an in-vehicle LAN (Local Area Network) having a wired or wireless structure, or a communication line such as a dedicated cable. The image pickup device 1 is disposed in front of the driver, e.g. at the handle or the dashboard in a vehicle, and adjusted to be able to take an image so that the width and the height of the face of the driver become the horizontal direction and the vertical direction of an image.

The image pickup device 1 comprises: an MPU (Micro Processor Unit) 11 for controlling the entire device; a ROM (Read Only Memory) 12 for recording data and various kinds of computer programs to be executed based on control of the MPU 11; a RAM (Random Access Memory) 13 for recording various kinds of data to be generated temporally during execution of a computer program recorded in the ROM 12; an image pickup unit 14 constituted of an image pickup element such as a CCD (Charge Coupled Device); an A/D converter 15 for converting analog image data obtained by image pickup of the image pickup unit 14 into digital data; a frame memory 16 for temporally recording digital image data converted by the A/D converter 15; and a communication interface 17 to be used for communication with the image processing device 2.

In the image pickup device 1, the image pickup unit 14 performs an image pickup process continuously or intermittently so as to generate 30 image data (image frames) per second, for example, on the basis of the image pickup process and output the same to the A/D converter 15, and the A/D converter 15 converts each pixel constituting an image into digital image data which is shown by a gradation such as 256 gradation (1 Byte) and causes the frame memory 16 to record the digital image data. The image data recorded by the frame memory 16 is outputted from the communication interface 17 to the image processing device 2 at predetermined timing. Each pixel constituting an image is arranged in a two-dimensional manner and the image data includes data indicative of the location of each pixel indicated by a plane rectangular coordinate system, or what is called an XY coordinate system, and the brightness of each pixel indicated as a gray value. It should be noted that a coordinate of each pixel may be respectively indicated by the order to be arranged in data, instead of an XY coordinate system. In addition, the horizontal direction of an image corresponds to the X-axis direction of image data and the vertical direction of an image corresponds to the Y-axis direction of image data.

The image processing device 2 comprises: a CPU (Central Processing Unit) 21 for controlling the entire device; an auxiliary recording unit 22 such as a CD-ROM drive for reading information from a record medium 41 such as a CD-ROM for recording various kinds of information such as data and a computer program 31 according to Embodiment 1 of the present invention; a hard disk (which will be hereinafter referred to as an HD) 23 for recording various kinds of information read by the auxiliary recording unit 22; a RAM 24 for recording various kinds of data to be generated temporarily during execution of the computer program 31 recorded in the HD 23; a frame memory 25 constituted of a volatile memory; and a communication interface 26 to be used for communication with the image pickup device 1.

In addition, by reading various kinds of information such as data and the computer program 31 of the present invention from the HD 23, causing the RAM 24 to record the same and running various kinds of procedures included in the computer program 31 with the CPU 21, an in-vehicle computer operates as the image processing device 2 of the present invention. Data to be recorded in the HD 23 includes data such as data according to execution of the computer program 31, a variety of data such as mathematical expressions, which will be explained later, filters and various kinds of constants, for example, and also data indicative of a detected detection object or a candidate of a detection object.

In the image processing device 2, image data outputted from the image pickup device 1 is accepted at the communication interface 26, the accepted image data is recorded in the frame memory 25 and the image data recorded in the frame memory 25 is read out for performing a variety of image processing. A variety of image processing to be executed for the accepted image data is a variety of processes necessary for detection of an area such as the facial contour, eyes and a nose of the driver from image data. A concrete example of a process is a contour width detecting process of integrating the brightness on a vertical line of an image and comparing the integrated value with a predetermined threshold so as to detect the range in the horizontal direction of the facial contour constituted of pixels having higher brightness than background. Moreover, another example of a process is a contour width detecting process of further differentiating a change in the horizontal direction in the integrated value in the above process to identify the location having a large change and detecting a boundary between background and the facial contour where the brightness greatly changes. The detailed content of the processes is described in documents such as Japanese Patent Application Laid-Open Nos. 2004-234494 and 2004-234367, for example, which have been applied by the present applicant. It should be noted that the above image processing is not always limited to the processes described in Japanese Patent Application Laid-Open Nos. 2004-234494 and 2004-234367, and can be selected properly according to the terms such as the use thereof, the hardware structure or cooperation with other application programs.

The following description will explain a process of various kinds of devices to be used in an image processing system according to Embodiment 1 of the present invention. Embodiment 1 of the present invention is for a detection object of an area including nares in the face of the driver to right and left nostrils from an image obtained by image pickup of the face of the driver with the image pickup device 1 such as an in-vehicle camera mounted on a vehicle, for example, as explained using Drawing 1. Drawing 2 and Drawing 3 is a flow chart showing an example of a process of the image processing device 2 to be used in an image processing system according to Embodiment 1 of the present invention. The image processing device 2 extracts image data, which is obtained by image pickup of the image pickup device 1 and accepted via the communication interface 26, from the frame memory 25 under control of the CPU 21 for executing the computer program 31 recorded in the RAM 24 (S101), detects the width of the face of the driver, i.e. a range in the horizontal direction (first direction) of the contour which is the boundary of an area indicative of the face, from the extracted image data by, for example, the contour width detecting process described above (S102) and sets a range of image processing to be performed later on the basis of the detected result (S103). The range (width of the contour) of an area detected in the step S102 and the range of image processing are recorded in the HD 23 or the RAM 24.

The image processing device 2 then integrates the brightness of pixels lined up in the horizontal direction (first direction) for an image of the range, which is extracted in the step S101 and set in the step S103, under control of the CPU 21 (S104), derives a change in an integrated value in the vertical direction (second direction) from the integrated result (S105) and detects a plurality of locations indicative of a local minimum value as locations in the vertical direction corresponding to candidates of a detection object, from the derived change in an integrated value in the vertical direction (S106). Detected in the step S106 is not only an area including nares, which are the original detection object, to right and left nostrils but also a plurality of candidates including even eyebrows, eyes and a mouth having low brightness.

The image processing device 2 obtains a quadratic differential value of a change in the integrated value, which is derived in the step S105, under control of the CPU 21 (S107) and detects a predetermined number of, such as ten, locations as locations of candidates including a detection object in the vertical direction in order of increasing quadratic differential value in a plurality of locations indicative of a local minimum value detected in the step S106 (S108). The process in the step S107 for obtaining a quadratic differential value of a change in the integrated value is performed using the following Expression 1, for example. The step S107 is a process for narrowing down candidates detected in the step S106, and up to ten candidates are detected in the process in the steps S104-S108. Here, it will be obvious that the number of candidates to be detected in the step S108 becomes smaller than ten when the number of candidates detected in the step S106 is smaller than ten. It should be noted that the predetermined number is a numerical value which can be changed according to need, which is preliminarily recorded in the HD 23 or the RAM 24. Moreover, data indicative of candidates detected in the step S108 is recorded in the HD 23 or the RAM 24.

$$\text{Quadratic Differential Value} = P(y) \cdot 2 - P(y-8) - P(y+8) \quad \text{Expression 1}$$

Here, y: coordinate in the vertical direction (y coordinate)
P(y): integrated value of location y The image processing device 2 then reads each location in the vertical direction, which is a candidate of a detection object detected in the step S108, from the HD 23 or the RAM 24 under control of the CPU 21, detects ends in the horizontal direction, i.e. the right and left ends, of a candidate of a detection object for each of rows of pixels lined up in the horizontal direction corresponding to each read location on the basis of a change in the brightness of pixels (S109) and detects a range in the horizontal direction to be a candidate of a detection object on the basis of the detected right and left ends (S110). It should be noted that a candidate the right and left ends of which are not detected in the step S109, i.e. a candidate only one end side of which is detected or a candidate no end of which is detected, is excluded from candidates of a detection object and the content recorded in the HD 23 or the RAM 24 is updated. The process in the step S109 is performed by detecting a point, where the continuous state of pixels having lower brightness than the surrounding ends, as an end as will be explained later. Moreover, the process in the steps S109-S110 is performed for all candidates of a detection object and further narrowing down of candidates of a detection object and detection of a range are performed.

The image processing device 2 then compares the length of a range in the horizontal direction of a candidate of a detection object, which is detected in the step S110 and recorded, with the length of the range (width of contour) in the horizontal direction of an area of the face of the driver, which is detected in the step S102 and recorded, under control of the CPU 21, specifies a candidate of a detection object, for which the ratio of the length of the range in the horizontal direction to the length of the range in the horizontal width in the vertical direction of a predetermined number of, such as three or five, pixels, under control of the CPU 21 (S112), integrates the brightness of pixels lined up in the vertical direction in the set test area, derives a change in an integrated value in the horizontal direction (S113), detects local minimum values from the derived change in an integrated value in the horizontal direction (S114), counts the number of the detected local minimum values (S115) and determines whether the counted number of local minimum values is smaller than a predetermined number, two here, 10 or not (S116). When the number of local minimum values counted in the step S115 is smaller than the predetermined number (S116: YES), the image processing device 2 determines that the detection object specified in the step S111 is false and detection of a detection object is impossible under control of the CPU 21 (S117), updates the record content of the HD 23 or the RAM 24 on the basis of the determined result and terminates the process. When the specified detection object is an area including nares to right and left nostrils, it is possible to count two or more local minimum values since locations corresponding to nares have a local minimum value in a change in an integrated value derived in the step S113. Accordingly, when the number of local minimum values is zero or one, it is determined that the specified specified detection object is false. It should be noted that, even when there are three or more local minimum values, it is not determined that the detection object is false only by the fact since a location such as the vicinity of the contour of nostrils becomes shady and may indicate a local minimum value.

When the number of the counted local minimum values is two, which is the predetermined number, or larger in the step S116 (S116: NO), the image processing device 2 counts the number of pixels continuous in the vertical direction, which include a pixel corresponding to the local minimum values and have brightness equal to said pixel, under control of the CPU 21 (S118) and determines whether the counted number of continuous pixels is larger than or equal to a predetermined number, which is preliminarily set, or not (S119). In the step S118, the continuity in the vertical direction of pixels having low brightness is determined. It should be noted that there is no need to always count only pixels having brightness equal to a pixel corresponding to the local minimum value, since counting of the number of pixels is intended to determine the continuity of pixels having low brightness. In particular, when the brightness is shown by a gradation classified into 256 grades and the gradation of a pixel indicative of a local minimum value is 20, it is preferable to count the continuity with gradation having a width such as 20±5.

When the counted number of continuous pixels is larger than the predetermined number, which is preliminarily set, in the step S119 (S119: YES), the image processing device 2 determines that direction of an area of the face of the driver is within a range of 22-43%, of candidates of a detection object as a detection object (S111) and updates the content recorded in the HD 23 or the RAM 24 as a candidate of a detection object. In the step S111, whether the ratio of the length of the range in the horizontal direction of a detection area including a detection object, i.e. an area of the face, to the length of the range in the horizontal direction of a candidate of a detection object, i.e. an area including nares to right and left nostrils, is within a predetermined range, a range of 22-43% here, or not is determined for all candidates of a detection object, and a candidate of a detection object, the ratio of which is within the predetermined range, is detected as a detection object. It should be noted that a candidate of a detection object is specified on the basis of an index (transverse edge score which will be explained later) to be used in a detecting process of a range shown in the steps S109-S110 when there are a plurality of candidates of a detection object the ratio of which is within the predetermined range in the step S111. Moreover, the numerical value of 22-43% shown as a predetermined range is not fixed and is a numerical value which will be set properly depending on factors such as the race of the driver.

The image processing device 2 then sets a test area, which includes the detection object specified in the step S111 and has a width in the horizontal direction equal to the detection object and a the detection object specified in the step S111 is false and detection of a detection object is impossible under control of the CPU 21 (S117), updates the record content of the HD 23 or the RAM 24 on the basis of the determined result and terminates the process. That is, it is determined that the frame of an eyeglass is detected falsely when the continuity of pixels having low brightness is larger than or equal to the predetermined number.

When the counted number of continuous pixels is smaller than or equal to the predetermined number, which is preliminarily set, in the step S119 (S119: NO), the image processing device 2 determines that the detection object specified in the step S111 is true and detection of a detection object has been achieved under control of the CPU 21 (S120), updates the record content of the HD 23 or the RAM 24 on the basis of the determined result and terminates the process.

It should be noted that it is also determined that detection of a detection object is impossible when all candidates of a detection object is excluded in the process of narrowing down candidates of a detection object, such as the steps S109-S111.

The following description will explain the process, which has been explained using the flow chart in Drawing 2 and Drawing 3, further specifically. Drawing 4 is an explanatory view conceptually showing an example of a process from decision of a range to detection of a candidate of a detection object of a process of an image of an image processing system according to Embodiment 1 of the present invention. Drawing 4(*a*) shows a state where the range of a process of an image is decided, wherein the outer frame shown in full line is the entire image shown by image data extracted in the step S101, and a taken image of the face of the driver and an area including nares in the face of the driver, which is a detection object, to right and left nostrils are shown. The lines in the vertical direction (Y-axis direction) of the image shown in long dashed short dashed line are the range of the area detected in the step S102, i.e., the width of the facial contour of the driver. In addition, an area surrounded by the width of the facial contour shown in long dashed short dashed line and the upper and lower frame in the entire image shown in full line is the range of image processing to be set in the step S103.

Drawing 4(*b*) is a graph showing the distribution of an integrated value of the brightness in the vertical direction, which is obtained by integrating the brightness of pixels lined up in the horizontal direction in the step S104 and derived in the step S105. Drawing 4(*b*) shows the distribution of an integrated value of the brightness in the vertical direction of the image shown in Drawing 4(*a*), wherein the ordinate axis indicates a coordinate in the vertical direction corresponding to Drawing 4(*a*) and the abscissa axis indicates an integrated value of the brightness. As shown in Drawing 4(*b*), an integrated value of the brightness in the vertical direction changes so as to have local minimum values indicated by the arrows at parts such as eyebrows, eyes, nares and a mouth, and it can be understood that it is possible to detect candidates of a detection object on the basis of the local minimum values in the step S106.

The following description will explain a process according to the steps S109-S111. Drawing 5 is an explanatory view schematically showing an example of a range for which an end detecting process of an image processing system according to Embodiment 1 of the present invention is performed, and Drawing 6 is an explanatory view showing an example of coefficients to be used in an end detecting process of an image processing system according to Embodiment 1 of the present invention. Drawing 5 shows pixels in the vicinity of a candidate of a detection object, wherein the numbers shown on the upper side of Drawing 5 indicate locations in the horizontal direction of pixels, i.e. x coordinates, and the symbols shown on the left side indicate locations in the vertical direction of pixels, i.e. y coordinates. The row y of pixels, which are lined up in the lateral direction of Drawing 5 and shown with diagonal lines extending from top right to bottom left and have a value y of a y coordinate, indicates a candidate of a detection object, and used for detection of an end are the row y of pixels, and the row y+1 and the row y−1 of pixels, which adjoin the row y of pixels from upside and downside, are shown with diagonal lines extending from top left to bottom right and have values of y coordinates respectively of y+1 and y−1. In addition, multiplication of each pixel included in the rows y, y+1 and y−1 of pixels by the coefficients shown in Drawing 6 functions as a transverse edge filter for clarifying an end of an area of continuous pixels, which are lined up in the horizontal direction and have low brightness. The coefficients shown in Drawing 6 indicate coefficients to be used for multiplication of the brightness of nine pixels as a matrix of 3×3, so that the brightness of one pixel at the center and the brightness of eight adjacent pixels are respectively multiplied with one corresponding coefficient and the absolute value of the sum of the result is computed as a transverse edge coefficient of a pixel located at the center. The transverse edge coefficient is obtained by adding numerical values obtained by multiplying the brightness of adjacent pixels on the left side by "−1" and numerical values obtained by multiplying the brightness of adjacent pixels on the right side by "1" as shown in Drawing 6. It should be noted that the area of 3×3 shown in wide line in Drawing 5 shows a state where a transverse edge filter corresponds to a pixel indicated by a coordinate (2, y+1), and the transverse edge coefficient of the pixel indicated by the coordinate (2, y+1) is computed by the following Expression 2.

$$|P(3, y+2)+P(3, y+1)+P(3, y)-P(1, y+2)-P(1, y+1)-P(1, y)|$$ Expression 2

Here, x: coordinate in the horizontal direction (x coordinate)

y: coordinate in the vertical direction (y coordinate)

p(x, y): brightness of pixel of coordinate (x, y)

As described above, a transverse edge coefficient is computed for pixels included in the row y of pixels lined up in the horizontal direction, which is a candidate of a detection object, and the rows y−1 and y+1 of pixels adjoining thereof from upward and downward.

Drawing 7 is an explanatory view schematically showing an example of a range for which an end detecting process of an image processing system according to Embodiment 1 of the present invention is performed. The numbers shown on the upper side of Drawing 7 indicate locations in the horizontal direction of pixels, i.e. x coordinates, and the symbols shown on the left side indicate locations in the vertical direction of pixels, i.e. y coordinates. The row y of pixels, which are lined up in the lateral direction of Drawing 7 and have a value y of a y coordinate, indicates a candidate of a detection object, and a transverse edge coefficient is computed for the row y of pixels, and the row y+1 and the row y−1 of pixels, which adjoin the row y of pixels from upside and downside and have values of y coordinates respectively of y+1 and y−1. In addition, regarding each of pixels excluding the pixels at the ends of the row y of pixels, which are shown with diagonal lines extending from top right to bottom left, the transverse edge coefficient and a predetermined threshold preliminarily set are compared for nine pixels including one pixel and eight pixels adjacent to said pixel. In addition, an index, which indicates the number of pixels having a transverse edge coefficient larger than the predetermined threshold, is computed as a transverse edge score of the one pixel. The area of 3×3 surrounded by wide line in Drawing 7 indicates pixels necessary for computation of a transverse edge score of a pixel indicated by a coordinate (3, y). The number of pixels, which has a transverse edge coefficient larger than the threshold, of the nine pixels in the area surrounded by wide line in Drawing 7 becomes a transverse edge score of the pixel indicated by the coordinate (3, y).

In addition, it is determined that a pixel, which has a transverse edge score that may indicates a value from 0 to 9 is larger than or equal to 5, is within the range in the horizontal direction of a candidate of a detection object. That is, the image processing device 2 detects the leftmost pixel having a transverse edge score larger than or equal to 5 as a left end in the horizontal direction of a candidate of a detection object and a rightmost pixel having a transverse edge score larger than or equal to 5 as a right end in the horizontal direction of a candidate of a detection object in the step S109. In addition, detected in the step S110 is the range in the horizontal direction of a candidate of a detection object on the basis of the detected right and left ends.

Drawing 8 is an explanatory view schematically showing an example of a range for which an end detecting process of an image processing system according to Embodiment 1 of the present invention is performed. Drawing 8 shows pixels of a candidate of a detection object and transverse edge scores, and the numbers shown on the upper side of Drawing 8 indicate locations in the horizontal direction of the pixels, i.e., x coordinates. Detected for the example shown in Drawing 8 is a range in the horizontal direction of a detection object from a pixel having an x coordinate of 5 to a pixel having an x coordinate of 636.

Drawing 9 is an explanatory view showing candidates of a detection object of an image processing system according to Embodiment 1 of the present invention. Drawing 9 shows an image of the face of the driver and candidates of a detection object, the range in the horizontal direction of which is detected in the process in the steps S109-S110. In Drawing 9, the x-marks indicate the right and left ends detected in the step S109 and the line segments connecting the right and left ends indicated by the x-marks indicate candidates of a detection object. A candidate, the right and left ends of which are not detected, is excluded from a detection object at this stage. In the example shown in Drawing 9, the locations of the eyebrows, eyes, nares, mouth and jaw are the candidates of a detection object.

In addition, a detection object is specified from the candidates of a detection object in the step S111 by comparing the range in the horizontal direction of the area of the face of the driver shown in Drawing 4 and the range in the horizontal direction of the candidates of a detection object shown in Drawing 9. It should be noted that, when a plurality of candidates of a detection object are specified in the step S111, the number of pixels having a transverse edge score larger than or equal to a predetermined value in the respective pixels lined up in the horizontal direction forming each specified detection object is counted for each specified detection object, and an index indicated by the obtained numerical value is set as a naris area score. In addition, a detection object having the maximum naris area score is set as a true detection object and the other detection objects are excluded as a false detection object.

Drawing 10 is an explanatory view conceptually showing a naris area score of an image processing system according to Embodiment 1 of the present invention. Drawing 10 shows pixels included in the range in the horizontal direction of the detection object detected in Drawing 8 and numerical values indicating transverse edge scores of said pixels, and the pixels with circled numerical values indicate that the transverse edge score is larger than or equal to a predetermined value, 5 here. In addition, the number of pixels having a transverse edge score larger than or equal to a predetermined value is counted and set as a naris area score.

In addition, in an image processing system of the present invention, true or false of the specified detection object is further determined by a process after the step S112.

Various kinds of conditions and the like including numerical values shown in the above Embodiment 1 are absolutely an example, and can be set properly depending on the situation such as the system structure and the purpose.

Embodiment 2

Drawing 11 is a block diagram showing a structure example of an image processing system according to Embodiment 2 of the present invention. Denoted at 1 in Drawing 11 is the image pickup device, which is connected with the image processing device 2 via a dedicated cable, for example. The image pickup device 1 comprises the MPU 11, the ROM 12, the RAM 13, the image pickup unit 14, the A/D converter 15, the frame memory 16 and the communication interface 17.

The image processing device 2, which comprises the CPU 21, the auxiliary recording unit 22, the HD 23, the RAM 24, the frame memory 25 and the communication interface 26, reads various kinds of information, with the auxiliary recording unit 22, from a record medium 42 recording various kinds of information such as data and a computer program 32 according to Embodiment 2 of the present invention, records the same in the HD 23, records the same in the RAM 24 and runs the same with the CPU 21, so as to run various kinds of procedures according to Embodiment 2 of the present invention.

It should be noted that the detailed explanation of each device, which is the same as Embodiment 1, is obtained by referring to Embodiment 1 and will be omitted.

The following description will explain a process of various kinds of devices to be used in an image processing system according to Embodiment 2 of the present invention. Embodiment 2 of the present invention is for a detection object of nares in the face of the driver from an image obtained by image pickup of the face of the driver with the image pickup device 1 such as an in-vehicle camera which is mounted on a vehicle, for example. Drawing 12 is a flow chart showing an example of a process of the image processing device 2 to be used in an image processing system according to Embodiment 2 of the present invention. The image processing device 2 extracts image data, which is obtained by image pickup of the image pickup device 1 and accepted via the communication interface 26, from the frame memory 25 under control of the CPU 21 for executing the computer program 32 recorded in the RAM 24 (S201), detects the width of the face of the driver, i.e. the range in the horizontal direction of the contour which is the boundary of an area indicative of the face, from the extracted image data by, for example, the contour width detecting process shown in Embodiment 1 (S202) and further detects an area including nares to right and left nostrils as a naris peripheral area (S203). The range in the horizontal direction of the contour detected in the step S202 and the naris peripheral area detected in the step S203 are recorded in the HD 23 or the RAM 24. The method shown in Embodiment 1 is used as the method for detecting a naris peripheral area in the step S203, for example.

The image processing device 2 then derives two points, which become local minimum values, as local minimum points from a change in the brightness of pixels in the horizontal direction of the naris peripheral area detected in the step S203 under control of the CPU 21 (S204) and sets a search range for detecting a detection object on the basis of the derived two local minimum points (S205). The search range set in the step S205 is recorded in the HD 23 or the RAM 24. When there are three or more local minimum points in the step S205, two points having smaller brightness are derived as local minimum points. A range to be set in the step S205 is a range including respectively 15 pixels on either side in the horizontal direction and respectively 5 pixels on either side in the vertical direction for each of the two derived points of local minimum values. It should be noted that it can be considered that a search range is set in the step S205 for each of right and left nares since the two local minimum points derived in the step S204 are considered points relating to right and left nares.

The image processing device 2 then converts the brightness of all pixels in the search range set in the step S205 under control of the CPU 21 by a black area computation filtering process of performing addition based on the brightness of another adjoining pixel and subtraction based on the brightness of a pixel located at a predetermined distance in the horizontal direction and the brightness of a pixel located at a predetermined distance in the vertical direction (S206), detects a pixel, a converted value of which 15 becomes the minimum, as a detection object (S207) and records the detected result in the HD 23 or the RAM 24. The process in the steps S206-S207 is performed for pixels included in the respective search ranges of right and left nares.

The following description will explain the process, which has been explained using the flow chart in Drawing 12, further specifically. Drawing 13 is an explanatory view conceptually showing an example of setting of a detection range of an image processing system according to Embodiment 2 of the present invention. In Drawing 13, the outer frame shown in full line is the entire image shown by image data extracted in the step S201 and the lines in the vertical direction (Y-axis direction) of the image shown in long dashed short dashed line is the range of the area detected in the step S202, i.e., the width of the facial contour of the driver. In addition, the line segment in the horizontal direction indicated by wide full line is an area including nares to right and left nostrils, which is detected in the step S203 as a naris peripheral area.

Drawing 14 is an explanatory view conceptually showing an example of setting of a search range of an image processing system according to Embodiment 2 of the present invention. Drawing 14 shows a peripheral image including nares and the rectangular ranges shown in full line in Drawing 14 are search ranges which are set in the step S205 for each of right and left nares.

Drawing 15 is an explanatory view showing an example of coefficients to be used in a black area computation filtering process of an image processing system according to Embodiment 2 of the present invention. By multiplying pixels included in the search range by coefficients shown in Drawing 15, it is possible to clarify an area where the brightness is low at the center and high in the surrounding. In the black area computation filter shown in Drawing 15, "1" is set as a coefficient to be used for multiplication of the brightness of one pixel, which becomes an object of conversion, and the brightness of eight adjacent pixels, "−1" is set as a coefficient to be used for multiplication of the brightness of two pixels lined up at a predetermined distance from the one pixel on each of right and left sides and "−1" is set as a coefficient to be used for multiplication of the brightness of two pixels lined up at a predetermined distance from the one pixel on each of upper and lower sides. It should be noted that the predetermined distance is set to $1/18$ of the area detected in the step S202.

Drawing 16 is an explanatory view conceptually showing an example of detection using a black area computation filtering process of an image processing system according to Embodiment 2 of the present invention. Drawing 16 shows the location of a black area computation filter in a black area computation filtering process, which is performed for a detection object detected as a naris on your left side in Drawing 16, in the search range set as shown in Drawing 14. Regarding the black area computation filter set with conditions shown in Drawing 15, coefficients for addition are located at nares and coefficients for subtraction are located outside nares in the black area computation filtering process for pixels in the vicinity of the center of nares as shown in Drawing 16, it is possible to clarify the center of nares.

Various kinds of conditions and the like including numerical values shown in the above Embodiment 2 are absolutely an example, and can be set properly depending on the situation such as the system structure and the purpose.

Embodiment 3

Drawing 17 is a block diagram showing a structure example of an image processing system according to Embodiment 3 of the present invention. Denoted at 1 in Drawing 17 is the image pickup device, which is connected with the image processing device 2 via a dedicated cable, for example. The image pickup device 1 comprises the MPU 11, the ROM 12, the RAM 13, the image pickup unit 14, the A/D converter 15, the frame memory 16 and the communication interface 17.

The image processing device 2, which comprises the CPU 21, the auxiliary recording unit 22, the HD 23, the RAM 24, the frame memory 25 and the communication interface 26, reads various kinds of information, with the auxiliary recording unit 22, from a record medium 43 recording various kinds of information such as data and a computer program 33 according to Embodiment 3 of the present invention, records the same in the HD 23, records the same in the RAM 24 and runs the same with the CPU 21, so as to run various kinds of procedures according to Embodiment 3 of the present invention.

It should be noted that the detailed explanation of each device, which is the same as Embodiment 1, is obtained by referring to Embodiment 1 and will be omitted.

The following description will explain a process of various kinds of devices to be used in an image processing system according to Embodiment 3 of the present invention. Embodiment 3 of the present invention is for a detection object of a downside area surrounding nares in the face of the driver from an image obtained by image pickup of the face of the driver with the image pickup device 1 such as an in-vehicle camera which is mounted on a vehicle, for example. Drawing 18 is a flow chart showing an example of a process of the image processing device 2 to be used in an image processing system according to Embodiment 3 of the present invention. The image processing device 2 extracts image data, which is obtained by image pickup of the image pickup device 1 and accepted via the communication interface 26, from the frame memory 25 under control of the CPU 21 for executing the computer program 33 recorded in the RAM 24 (S301), detects the width of the face of the driver, i.e. the range in the horizontal direction of the contour which is the boundary of an area indicative of the face, from the extracted image data by, for example, the contour width detecting process shown in Embodiment 1 (S302), further detects the location of the eyes and nasal apex by an eyes and nasal apex detecting process using a process such as pattern matching (S303) and sets a search range on the basis of the detected range in the horizontal direction of the contour and the location of the eyes and nasal apex (S304). The range in the horizontal direction of the contour detected in the step S302, the location of the eyes and nasal apex detected in the step S303 and the search range set in the step S304 are recorded in the HD 23 or the RAM 24. It should be noted that the detailed content of the eyes and nasal apex detecting process in the step S302 is described in documents such as Japanese Patent Application Laid-Open Nos. 2004-234367 and 2004-234494 which have been applied by the present applicant, for example. Set as the search range in the step S304 is an area based on, for example, an upper end in the vertical direction located lower than the average of y coordinates indicative of locations in the vertical direction of the eyes by a distance equal to 1/16 of the width in the horizontal direction of the contour, a lower end located lower than the average of y coordinates of the eyes by a distance equal to 3/8 of the width of the contour, a left end in the horizontal direction located to the left of an x coordinate indicative of the location in the horizontal direction of the nasal apex by a distance equal to 1/8 of the width of the contour and a right end located to the right of an x coordinate of the nasal apex by a distance equal to 1/8 of the width of the contour.

The image processing device 2 then derives a horizontal pixel score, which is an index obtained by multiplying a numerical value based on a brightness difference from pixels adjacent in the horizontal direction by a numerical value indicative of a low level of brightness of pixels adjacent in the horizontal direction, for all pixels in the search range set in the step S304, under control of the CPU 21 (S305) and integrates derived horizontal pixel scores in the vertical direction so as to derive a horizontal score which is an index indicative of a change in an integrated value in the horizontal direction (S306). The image processing device 2 further derives a vertical pixel score, which is an index obtained by multiplying a numerical value based on a brightness difference from pixels adjacent in the vertical direction by a numerical value indicative of a low level of brightness of pixels adjacent in the vertical direction, for all pixels in the search range, under control of the CPU 21 (S307) and integrates derived vertical pixel scores in the horizontal direction so as to derive a vertical score which is an index indicative of a change in an integrated value in the vertical direction (S308). The image processing device 2 then detects an area based on a range in the horizontal direction from the maximum value to the minimum value of the horizontal score derived in the step S306 and a range in the vertical direction from the maximum value to the minimum value of the vertical score derived in the step S307 as a detection object under control of the CPU 21 (S309) and records the detected result in the HD 23 or the RAM 24.

The following description will explain the process, which has been explained using the flow chart in Drawing 18, further specifically. Drawing 19 is an explanatory view conceptually showing an example of setting of a search range of an image processing system according to Embodiment 3 of the present invention. In Drawing 19, the outer frame shown in full line is the entire image shown by image data extracted in the step S301, the lines in the vertical direction (Y-axis direction) of the image shown in long dashed short dashed line is the range of the area detected in the step S302, i.e. the width of the facial contour of the driver, and the positions indicated by the x-marks are the locations of the eyes and nasal apex detected in the step S303. In addition, the area shown in dotted line is the search range to be set in the step S304.

The horizontal pixel score to be derived in the step S305 is shown by the following Expression 3.

$$Sh(x, y) = \begin{cases} H(x, y) \cdot (255 - P(x+1, y)); & (H(x, y) \geq 0) \\ H(x, y) \cdot (255 - P(x-1, y)); & (H(x, y) < 0) \end{cases} \quad \text{Expression 3}$$

Here, x: coordinate in the horizontal direction (x coordinate)

y: coordinate in the vertical direction (y coordinate)

Sh(x, y): horizontal pixel score of pixel of coordinate (x, y)

H(x, y): horizontal edge filtering process result of pixel of coordinate (x, y)

P(x, y): brightness of pixel of coordinate (x, y)

Drawing 20 is an explanatory view showing an example of coefficients to be used in a horizontal edge filtering process of an image processing system according to Embodiment 3 of the present invention. In the mathematical expression shown in Expression 3, H(x, y) indicates the result of a horizontal edge filtering process to be performed using the coefficients shown in Drawing 20. Drawing shows coefficients to be used for multiplication of the brightness of nine pixels as a matrix of 3×3, so that the brightness of one pixel at the center and the brightness of eight adjacent pixels are respectively multiplied by a corresponding coefficient and the sum of the result is computed as a horizontal edge filtering process result of a pixel located at the center. In the horizontal edge filtering process to be performed using the coefficients shown in Drawing 20, an index which is the result is obtained by adding numerical values obtained by multiplying the brightness of adjacent pixels on the left side by "1" and numerical values obtained by multiplying the brightness of adjacent pixels on the right side by "−1". That is, a numerical value based on a brightness difference from pixels adjacent in the horizontal direction is obtained by the horizontal edge filtering process.

A mathematical expression to be used for multiplication of the result of the horizontal edge filtering process is a value obtained by subtracting the brightness of pixels adjacent in the horizontal direction from "255" indicative of the maximum numerical value of the gray value of the brightness of a pixel classified into 256 grades, and is a numerical value indicative of a low level of brightness. As described above, the horizontal pixel score is an index based on a numerical value based on a brightness difference from pixels adjacent in the horizontal direction and a numerical value indicative of a low level of brightness of pixels adjacent in the horizontal direction. It should be noted that the pixels, the brightness of which is used for a mathematical expression to be used for multiplication of the result of the horizontal edge filtering process, depends on the positive and negative of the result of the horizontal edge filtering process.

In addition, the horizontal score to be derived in the step S306 is an index indicative of the relation between the x coordinate, which is the location in the horizontal direction to be derived by integrating horizontal pixel scores in the vertical direction, and an integrated value. That is, a change in the horizontal direction in the horizontal pixel score is indicated by the horizontal score. In particular, the horizontal score can be shown so that the value becomes large at a position where the brightness of a pixel in the vertical direction greatly decreases and the value becomes small at a position where the brightness of a pixel greatly increases.

The vertical pixel score to be derived in the step S307 is shown by the following Expression 4.

$$Sv(x, y) = \begin{cases} V(x, y) \cdot (255 - P(x, y + 1)); & (V(x, y) \geq 0) \\ V(x, y) \cdot (255 - P(x, y - 1)); & (V(x, y) < 0) \end{cases} \quad \text{Expression 4}$$

Here, Vh(x, y): vertical pixel score of pixel of coordinate (x, y)

V(x, y): vertical edge filtering process result of pixel of coordinate (x, y)

P(x, y): brightness of pixel of coordinate (x, y)

Drawing 21 is an explanatory view showing an example of coefficients to be used in a vertical edge filtering process of an image processing system according to Embodiment 3 of the present invention. In the mathematical expression shown in Expression 4, V(x, y) indicates the result of a vertical edge filtering process to be performed using the coefficients shown in Drawing 21. Drawing 21 shows coefficients to be used for multiplication of the brightness of nine pixels as a matrix of 3×3, so that the brightness of one pixel at the center and the brightness of eight adjacent pixels are respectively multiplied by a corresponding coefficient and the sum of the result is computed as a vertical edge filtering process result of a pixel located at the center. In the vertical edge filtering process to be performed using the coefficients shown in Drawing 21, an index which is the result is obtained by adding numerical values obtained by multiplying the brightness of adjacent pixels on the upper side by "1" and numerical values obtained by multiplying the brightness of adjacent pixels on the lower side by "−1". That is, a numerical value based on a brightness difference from pixels adjacent in the vertical direction is obtained by the vertical edge filtering process.

A mathematical expression to be used for multiplication of the result of the vertical edge filtering process is a value obtained by subtracting the brightness of pixels adjacent in the vertical direction from "255" indicative of the maximum numerical value of the gray value of the brightness of a pixel classified into 256 grades, and is a numerical value indicative of a low level of brightness. As described above, the vertical pixel score is an index based on a numerical value based on a brightness difference from pixels adjacent in the vertical direction and a numerical value indicative of a low level of brightness of pixels adjacent in the vertical direction. It should be noted that the pixels, the brightness of which is used for a mathematical expression to be used for multiplication of the result of the vertical edge filtering process, depends on the positive and negative of the result of the vertical edge filtering process.

In addition, the vertical score to be derived in the step S308 is an index indicative of the relation between the y coordinate, which is the location in the vertical direction to be derived by integrating vertical pixel scores in the horizontal direction, and an integrated value. That is, a change in the vertical direction in the vertical pixel score is indicated by the vertical score. In particular, the vertical score can be shown so that the value becomes large at a position where the brightness of a pixel in the vertical direction greatly decreases and the value becomes small at a position where the brightness of a pixel greatly increases.

In addition, detected in the step S309 is an area having the maximum value of the horizontal score at the left end in the horizontal direction, the minimum value at the right end in the horizontal direction, the maximum value of the vertical score at the upper end in the vertical direction and the minimum value at the lower end in the vertical direction.

Drawing 22 is an explanatory view showing a result of detection of an image processing system according to Embodiment 3 of the present invention. Drawing 22 shows the search range set in the step S304, and the rectangular area shown with diagonal lines surrounded by the left end L, the right end R, the upper end U and the lower end D is the detected downside area surrounding nares.

Various kinds of conditions and the like including numerical values shown in the above Embodiment 3 are absolutely an example, and can be set properly depending on the situation such as the system structure and the purpose. For example, though the above Embodiment 3 shows an embodiment of deriving the vertical score after deriving the horizontal score, a variety of embodiments may be developed such as deriving the horizontal score after deriving the vertical score, or deriving only the vertical score and setting the left end and the right end in the horizontal direction as the width of the facial contour without deriving the horizontal score.

Embodiment 4

Drawing 23 is a block diagram showing a structure example of an image processing system according to Embodiment 4 of the present invention. Denoted at 1 in Drawing 23 is the image pickup device, which is connected with the image processing device 2 via a dedicated cable, for example. The image pickup device 1 comprises the MPU 11, the ROM 12, the RAM 13, the image pickup unit 14, the A/D converter 15, the frame memory 16 and the communication interface 17.

The image processing device 2, which comprises the CPU 21, the auxiliary recording unit 22, the HD 23, the RAM 24, the frame memory 25 and the communication interface 26, reads various kinds of information, with the auxiliary recording unit 22, from a record medium 44 recording various kinds of information such as data and a computer program 34 according to Embodiment 4 of the present invention, records the same in the HD 23, records the same in the RAM 24 and runs the same with the CPU 21, so as to run various kinds of procedures according to Embodiment 4 of the present invention. Recorded in the image processing device 2 according to Embodiment 4 of the present invention is a plurality of detection methods including the detection methods explained in Embodiments 1 to 3 of the present invention.

It should be noted that the detailed explanation of each device, which is the same as Embodiment 1, is obtained by referring to Embodiment 1 and will be omitted.

The following description will explain a process of various kinds of devices to be used in an image processing system according to Embodiment 4 of the present invention. Embodiment 4 of the present invention is for a detection object of an area including nares of the face of the driver from an image obtained by image pickup of the face of the driver with the image pickup device 1 such as an in-vehicle camera which is mounted on a vehicle, for example. Drawing 24 is a flow chart showing an example of a process of the image processing device 2 to be used in an image processing system according to Embodiment 4 of the present invention. The image processing device 2 extracts image data, which is obtained by image pickup of the image pickup device 1 and accepted via the communication interface 26, from the frame memory 25 under control of the CPU 21 for executing the computer program 34 recorded in the RAM 24 (S401), computes a mean value of the brightness of pixels included in the extracted image data (S402) and compares the mean value, which is the computed result, with a threshold which is preliminarily set for a mean value of the brightness (S403). The image processing device 2 further computes a variance value of the brightness of pixels under control of the CPU 21 (S404) and compares the variance value, which is the computed result, with a threshold which is preliminarily set for a variance value of the brightness (S405). The image processing device 2 then decides the priority of a plurality of detection methods recorded in the HD 23 on the basis of the comparison result between the mean value of the brightness and the threshold and the comparison result between the variance value of the brightness and the threshold under control of the CPU 21 (S406).

In Embodiment 4 of the present invention, a process of deciding the priority of detection methods on the basis of the mean value and the variance value of the brightness is performed. The priority to be decided is the necessity of execution of a plurality of detection methods and the order of execution, and the detection methods explained above in Embodiments 1 to 3 of the present invention and yet another detection method are executed according to the decided content.

Since the mean value and the variance value of the brightness of image data greatly changes depending on the status of a light ray for irradiating the face of the driver, the status of irradiation is determined from the mean value and the variance value so as to select the most suitable detection method. In particular, when there arises a partial change such as irradiation of only the left half of the face with sunlight, it is possible to determine that there arises a partial change since the mean value of the 10 brightness becomes smaller than or equal to the threshold and the variance value of the brightness becomes larger than or equal to the threshold, and priority is given to a detection method which is the most resistant to influence of the partial change.

For example, in a state where there is no partial change, the naris peripheral area is detected by the detection method shown in Embodiment 1 and nares are detected by the detection method shown in Embodiment 2 using the detected result. Since the range to be the object of image processing is limited by detecting the naris peripheral area, the processing speed is enhanced and the detection accuracy is enhanced. However, when a partial change arises, the reliability of the process using a transverse edge filter in Embodiment 1 is reduced since there is a high possibility that brightness saturation arises. Accordingly, priority is given to detection of nares by the detection method shown in Embodiment 2.

Though one threshold of the mean value of the brightness and one threshold of the variance value of the brightness are set in the above Embodiment 4, the present invention is not limited to this, and a plurality of thresholds may be set and the priority of detection methods depending on a variety of situations may be decided, or processing conditions such as various kinds of set values necessary for image processing for detection may be decided on the basis of the mean value and the variance value.

Though a process for image data indicated by a plane rectangular coordinate system is shown in the above Embodiments 1 to 4, the present invention is not limited to this and can be, for example, applied to image data of a variety of coordinate systems such as application to image data indicated by a coordinate system in which the first direction and the second direction cross at an angle of 60 degrees, when dealing with an image including pixels arranged in honeycomb geometry.

Moreover, though an embodiment for a detection object of the driver of a vehicle is shown in the above Embodiments 1 to 4, the present invention is not limited to this and an embodiment for a detection object of a variety of human, or even a living matter other than human or a nonliving matter can be also employed.

Furthermore, though an embodiment for detecting a detection object from an image generated by image pickup with an image pickup device using an in-vehicle camera is shown in the above Embodiments 1 to 4, the present invention is not limited to this and can be applied to a variety of image processing for recording an image generated by a variety of methods with a variety of devices in an HD and detecting a specific detection object from the recorded image.

The invention claimed is:

1. An image processing method of detecting a detection object from a two-dimensional image in which pixels are lined up in both a first direction and a second direction that are different from each other, comprising:
    obtaining the two-dimensional image;
    integrating brightness of pixels of the two-dimensional image lined up in the first direction;
    deriving a change in an integrated value of the two-dimensional image in the second direction;
    obtaining a quadratic differential value of the derived change;
    detecting a plurality of locations in the second direction, which indicate minimum values in ascending order of the obtained quadratic differential value among the integrated brightness of pixels in the first direction, as locations corresponding to candidates of a detection object on the basis of the derived change in an integrated value;
    detecting a range in the first direction based on a change of brightness of a pixel lined up in the first direction as a candidate of the detection object for each of rows of pixels lined up in the first direction corresponding to each detected location; and
    specifying the detection object from candidates of the detection object on the basis of length of the detected range.

2. An image processing method of detecting a detection object from a two-dimensional image in which pixels are lined up in both a first direction and a second direction that are different from each other, comprising:
    obtaining the two-dimensional image;
    integrating numerical values in the second direction, said numerical values being based on a change in brightness of pixels of the two-dimensional image lined up in the first direction;
    deriving a change in an integrated value of the two-dimensional image in the first direction;
    integrating numerical values in the first direction, said numerical values being based on a change in brightness of pixels lined up in the second direction;
    deriving a change in an integrated value in the second direction;
    obtaining a quadratic differential value of the derived changed in the second direction; and
    detecting a detection object on the basis of both a range in the first direction on the basis of the derived change in an integrated value in the first direction and a range in the second direction on the basis of the obtained quadratic differential value.

3. An image processing device which detects a detection object from a two-dimensional image in which pixels are lined up in both a first direction and a second direction that are different from each other, comprising:
    an obtaining part which obtains the two-dimensional image;
    a deriving part which integrates brightness of pixels of the two-dimensional image lined up in the first direction and derives a change in an integrated value of the two-dimensional image in the second direction;
    an obtaining part which obtains a quadratic differential value of the derived change;

a candidate detecting part which detects a plurality of locations in the second direction, which indicate minimum values in ascending order of the obtained quadratic differential value among the integrated brightness of pixels in the first direction, as locations corresponding to candidates of a detection object on the basis of the derived change in the integrated value;

a range detecting part which detects a range in the first direction based on a change of brightness of a pixel lined up in the first direction as a candidate of the detection object for each of rows of pixels lined up in the first direction corresponding to each of the plurality of detected locations; and a specifying part which specifies the detection object from candidates of the specific detection object on the basis of length of the detected range.

4. The image processing device according to claim 3, wherein the candidate detecting part detects the plurality of locations for which a change in an integrated value of brightness of pixels integrated in the first direction indicates a local minimum value.

5. The image processing device according to claim 4, further comprising a part which obtains a quadratic differential value of the change in an integrated value derived by the deriving part, wherein the candidate detecting part detects a predetermined number of locations in the plurality of locations indicating a local minimum value, on the basis of a result of quadratic differential.

6. The image processing device according to claim 3, wherein the range detecting part detects a range on the basis of a change in brightness of pixels lined up in the first direction.

7. The image processing device according to claim 3, further comprising a part which detects a range in the first direction of a detection area which includes the detection object and has a range in the first direction larger than the detection object, wherein the specifying part specifies the detection object on the basis of a result of comparison between length of a range in the first direction of a candidate of the detection object detected by the range detecting part and length of a range in the first direction of a detection area including the detection object.

8. The image processing device according to claim 3, further comprising:

a part which integrates brightness of pixels lined up in the second direction according to the specified detection object and derives a change in an integrated value in the first direction;

a local minimum value detecting part which detects a local minimum value from a change in an integrated value in the first direction;

a part which counts the number of detected local minimum values; and a part which determines that the specified detection object is false when the counted number is smaller than a predetermined number.

9. An image processing system, comprising:
an image processing device according to claim 3; and
an image pickup device which generates an image to be processed by the image processing device,
wherein the detection object is an area including nares of a person in an image taken by the image pickup device, the first direction is a horizontal direction, and the second direction is a vertical direction.

10. An image processing device which detects a detection object from a two-dimensional image in which pixels are lined up in both a first direction and a second direction that are different from each other, comprising:

obtaining the two-dimensional image;

a first deriving part which integrates numerical values, in the second direction, based on a change in brightness of pixels of the two-dimensional image lined up in the first direction and derives a change in an integrated value of the two-dimensional image in the first direction;

a second deriving part which integrates numerical values, in the first direction, based on a change in brightness of pixels lined up in the second direction and derives a change in an integrated value in the second direction an obtaining part which obtains a quadratic differential value of the derived change in the second direction; and a detecting part which detects a detection object on the basis of both a range in the first direction based on the change in an integrated value in the first direction derived by the first deriving part and a range in the second direction based on the obtained quadratic differential value.

11. The image processing device according to claim 10, wherein the first deriving part integrates indexes, in the second direction, based on both a numerical value based on a brightness difference from an adjoining pixel in the first direction and a numerical value indicating a low level of brightness of the adjoining pixel in the first direction and derive a change in an integrated value in the first direction, wherein the second deriving part integrates indexes, in the first direction, based on both a numerical value based on a brightness difference from an adjoining pixel in the second direction and a numerical value indicating a low level of brightness of the adjoining pixel in the second direction and derive a change in an integrated value in the second direction, and wherein the detecting part detects a detection object on the basis of both a range in the first direction from a location where the integrated value derived by the first deriving part becomes maximum to a location where the integrated value derived by the first deriving part becomes minimum and a range in the second direction from a location where the integrated value derived by the second deriving part becomes maximum to a location where the integrated value derived by the second deriving part becomes minimum.

12. An image processing system, comprising:
an image processing device according to claim 10; and
an image pickup device which generates an image to be processed by the image processing device,
wherein the detection object is an area including nares of a person in an image taken by the image pickup device, the first direction is a horizontal direction, and the second direction is a vertical direction.

13. A non-transitory computer-readable memory product storing a computer program that when executed causes a computer to perform a method of detecting a detection object from a two-dimensional image in which pixels are lined up in both a first direction and a second direction that are different from each other, said method comprising:

obtaining by the computer the two-dimensional image;

integrating in the computer brightness of pixels of the two-dimensional image lined up in the first direction;

deriving by the computer a change in an integrated value of the two-dimensional image in the second direction;

obtaining by the computer a quadratic differential value of the derived change;

detecting by the computer a plurality of locations in the second direction, which indicate minimum values in ascending order of the obtained quadratic differential value among the integrated brightness of pixels in the first direction, as locations corresponding to candidates of a detection object on the basis of the derived change in an integrated value;

detecting by the computer a range in the first direction based on a change of brightness of a pixel lined up in the first direction as a candidate of the detection object for each of rows of pixels lined up in the first direction corresponding to each detected location; and specifying by the computer the detection object from candidates of the detection object on the basis of length of the detected range.

14. A non-transitory computer-readable memory product storing a computer program that when executed causes a computer to perform a method of detecting a detection object from a two-dimensional image in which pixels are lined up in both a first direction and a second direction that are different from each other, said method comprising:

obtaining by the computer the two-dimensional image;

integrating in the computer numerical values, in the second direction, based on a change in brightness of pixels of the two-dimensional image lined up in the first direction;

deriving by the computer a change in an integrated value of the two-dimensional image in the first direction;

integrating in the computer numerical values, in the first direction, based on a change in brightness of pixels lined up in the second direction;

deriving by the computer a change in an integrated value in the second direction;

obtaining by the computer a quadratic differential value of the derived change in the second direction; and detecting by the computer a detection object on the basis of both a range in the first direction based on the derived change in an integrated value in the first direction and a range in the second direction based on the obtained quadratic differential value.

\* \* \* \* \*